(12) United States Patent
Watson et al.

(10) Patent No.: US 8,984,879 B2
(45) Date of Patent: Mar. 24, 2015

(54) SIMPLIFIED VARIABLE GEOMETRY TURBOCHARGER WITH VARIABLE FLOW VOLUMES

(75) Inventors: John P. Watson, Arden, NC (US); Tilman Bernauer, Ulm (DE); Kurtis E. Henderson, Candler, NC (US); David G. Grabowska, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 524 days.

(21) Appl. No.: 13/264,456

(22) PCT Filed: Apr. 19, 2010

(86) PCT No.: PCT/US2010/031535
§ 371 (c)(1),
(2), (4) Date: Oct. 14, 2011

(87) PCT Pub. No.: WO2010/123786
PCT Pub. Date: Oct. 28, 2010

(65) Prior Publication Data
US 2012/0036849 A1   Feb. 16, 2012

Related U.S. Application Data

(60) Provisional application No. 61/170,822, filed on Apr. 20, 2009.

(51) Int. Cl.
*F02D 23/00* (2006.01)
*F04D 29/44* (2006.01)
(Continued)

(52) U.S. Cl.
CPC .............. *F02B 37/22* (2013.01); *F01D 17/141* (2013.01); *F01D 17/146* (2013.01);
(Continued)

(58) Field of Classification Search
CPC ........ F02B 37/22; F02B 37/24; F02B 37/025; F01D 17/141; F01D 17/146; F01D 17/148; F05D 2220/40; F05D 2260/53; Y02T 10/144
USPC ............. 60/602; 415/145, 148, 155, 204–205
IPC ........................ F01D 17/14, 17/18; F04D 29/44
See application file for complete search history.

(56) References Cited

U.S. PATENT DOCUMENTS

| 98,741 A | * | 1/1870 | Chase |
| 3,313,518 A | * | 4/1967 | Nancarrow .................. 415/205 |

(Continued)

FOREIGN PATENT DOCUMENTS

| CN | 1454285 | 11/2003 |
| CN | 101368488 | 2/2009 |

(Continued)

*Primary Examiner* — Thai Ba Trieu
(74) *Attorney, Agent, or Firm* — Miller Canfield

(57) ABSTRACT

A variable geometry turbocharger is simplified yet able to maintain pulse energy. In a first embodiment, a turbine housing is provided with a pivoting wall which pivots about a point near the entry to the turbine housing. By moving the wall about the pivot point, the effective volume of the turbine housing volute is varied, thus effectively reducing the volume of exhaust gas in the volute, allowing control of exhaust gas flowing to the turbine wheel. In the second embodiment of the invention, a rotating wedge segment within the volute is rotated from a first position to a second position, changing the effective volume of the volute and allowing control of exhaust gas flowing to the turbine wheel.

18 Claims, 26 Drawing Sheets

(51) Int. Cl.
*F04D 29/54* (2006.01)
*F04D 29/56* (2006.01)
*F01D 17/12* (2006.01)
*F02B 37/22* (2006.01)
*F01D 17/14* (2006.01)
*F02B 37/02* (2006.01)
*F02B 37/24* (2006.01)

(52) U.S. Cl.
CPC .......... *F01D 17/148* (2013.01); *F02B 37/025* (2013.01); *F02B 37/24* (2013.01); *Y02T 10/144* (2013.01); *F05D 2260/53* (2013.01); *F05D 2220/40* (2013.01)
USPC .............. 60/602; 415/204; 415/205; 415/151

(56) References Cited

U.S. PATENT DOCUMENTS

| | | | |
|---|---|---|---|
| 3,552,876 A * | 1/1971 | Updike | 415/205 |
| 4,177,005 A * | 12/1979 | Bozung et al. | 415/204 |
| 4,512,716 A | 4/1985 | McHenry et al. | |
| 4,519,211 A * | 5/1985 | Sedille et al. | 415/205 |
| 4,769,994 A * | 9/1988 | Hirabayashi | 60/602 |
| 6,062,028 A | 5/2000 | Arnold et al. | |
| 6,553,762 B2 * | 4/2003 | Loffler et al. | 415/204 |
| 7,024,855 B2 | 4/2006 | Perrin et al. | |
| 7,481,056 B2 * | 1/2009 | Blaylock et al. | 60/602 |
| 7,810,327 B2 * | 10/2010 | Parker | 60/602 |
| 8,480,360 B2 * | 7/2013 | Wang et al. | 415/205 |
| 8,585,353 B2 * | 11/2013 | Arnold | 415/156 |
| 2008/0223037 A1 | 9/2008 | Ren et al. | |
| 2009/0041577 A1 | 2/2009 | Serres | |
| 2009/0064679 A1 * | 3/2009 | Parker | 60/602 |
| 2010/0166542 A1 | 7/2010 | Kasturirangan | |
| 2010/0266390 A1 * | 10/2010 | Henderson et al. | 415/151 |
| 2011/0052374 A1 * | 3/2011 | Arnold | 415/148 |
| 2013/0315718 A1 * | 11/2013 | Parker et al. | 415/157 |

FOREIGN PATENT DOCUMENTS

| | | | | |
|---|---|---|---|---|
| CN | 20259817 U | * | 12/2012 | F01D 25/24 |
| CN | 103953400 A | * | 7/2014 | F01D 25/24 |
| DE | 3831687 A1 | | 3/1990 | F01D 17/14 |
| FR | 2533627 A1 | * | 3/1984 | F01D 9/02 |
| JP | 57024402 A | * | 2/1982 | F01D 17/14 |
| JP | 60003500 A | * | 1/1985 | F04D 29/44 |
| JP | 60006020 A | * | 1/1985 | F01D 17/18 |
| JP | 11280482 A | * | 10/1999 | F01D 17/14 |
| JP | 11280483 A | * | 10/1999 | F01D 17/14 |
| JP | 2000008868 A | * | 1/2000 | F01D 17/14 |
| WO | 2007148145 | | 12/2007 | |

* cited by examiner

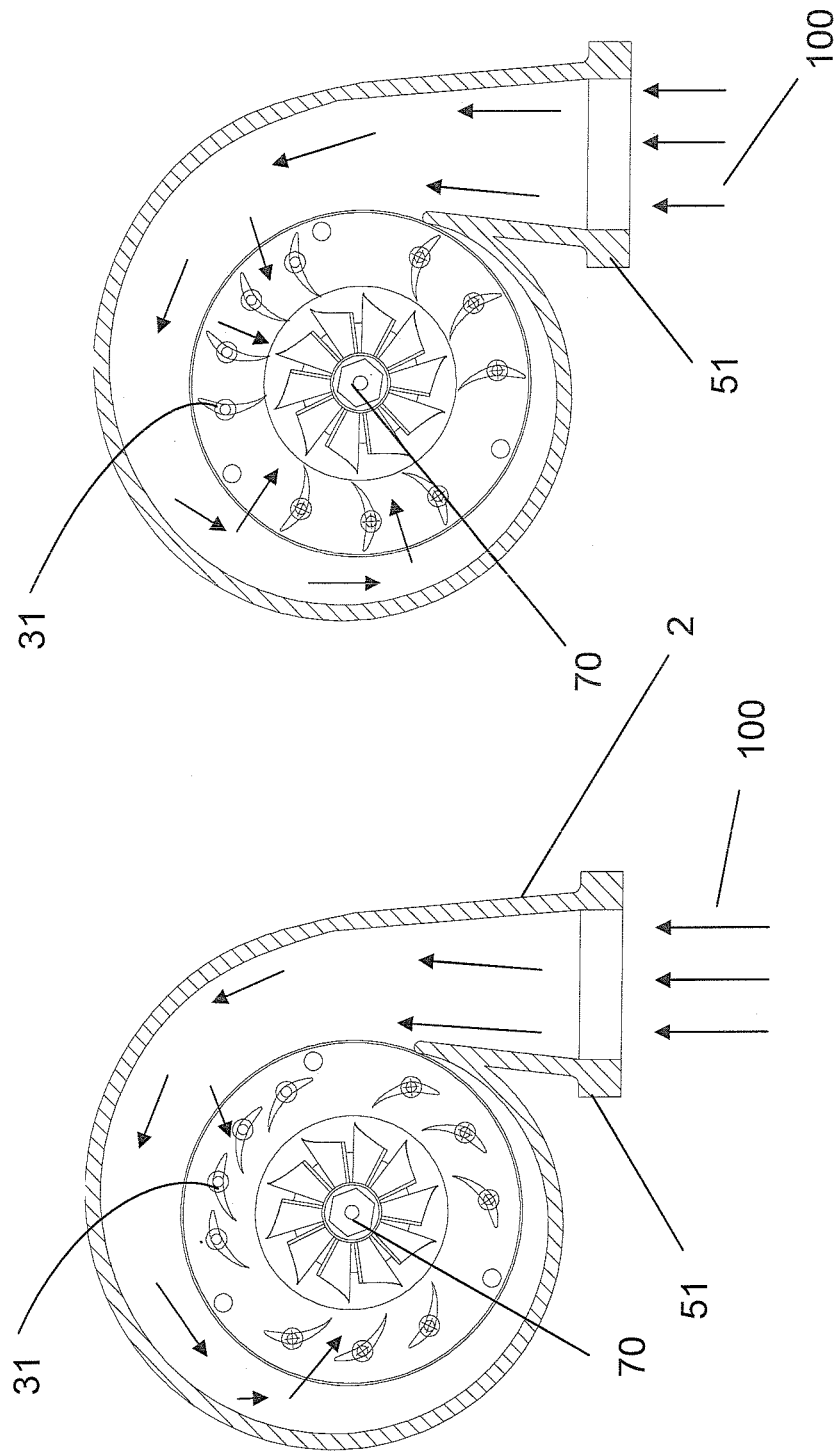

Section B-B

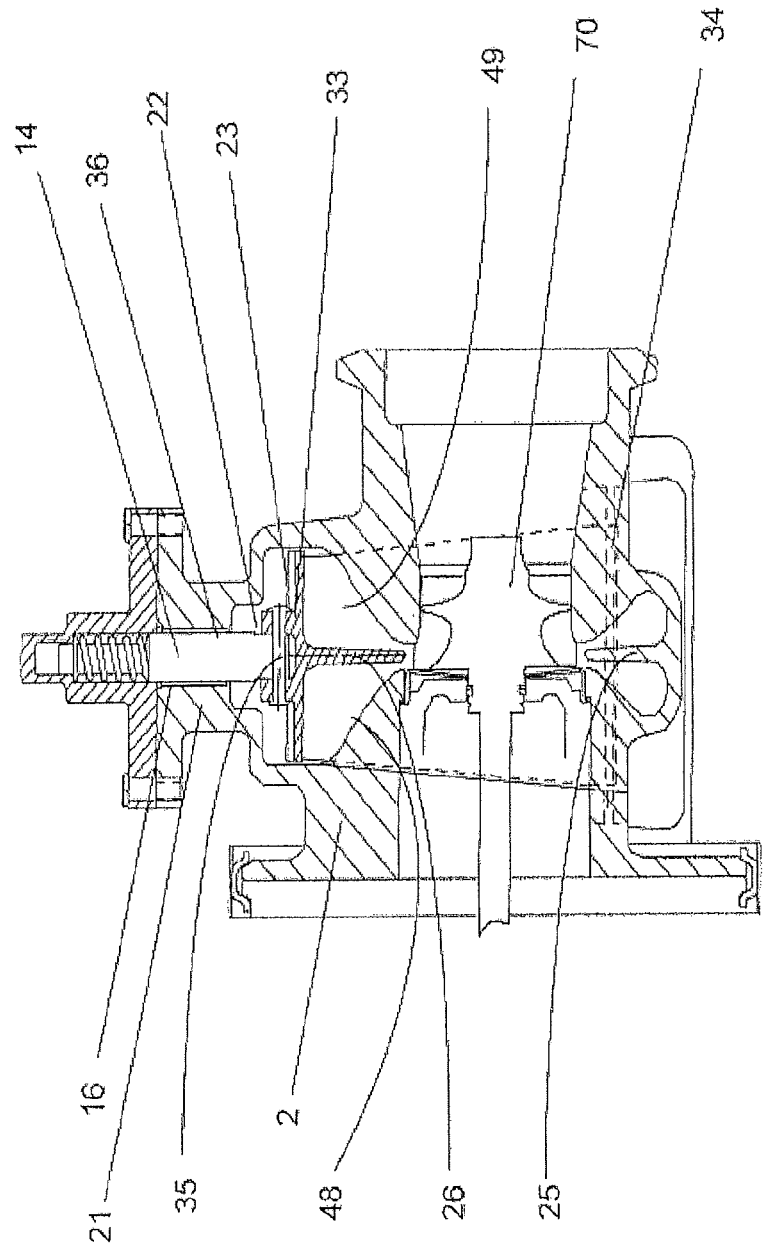
Fig. 12A    Section B-B

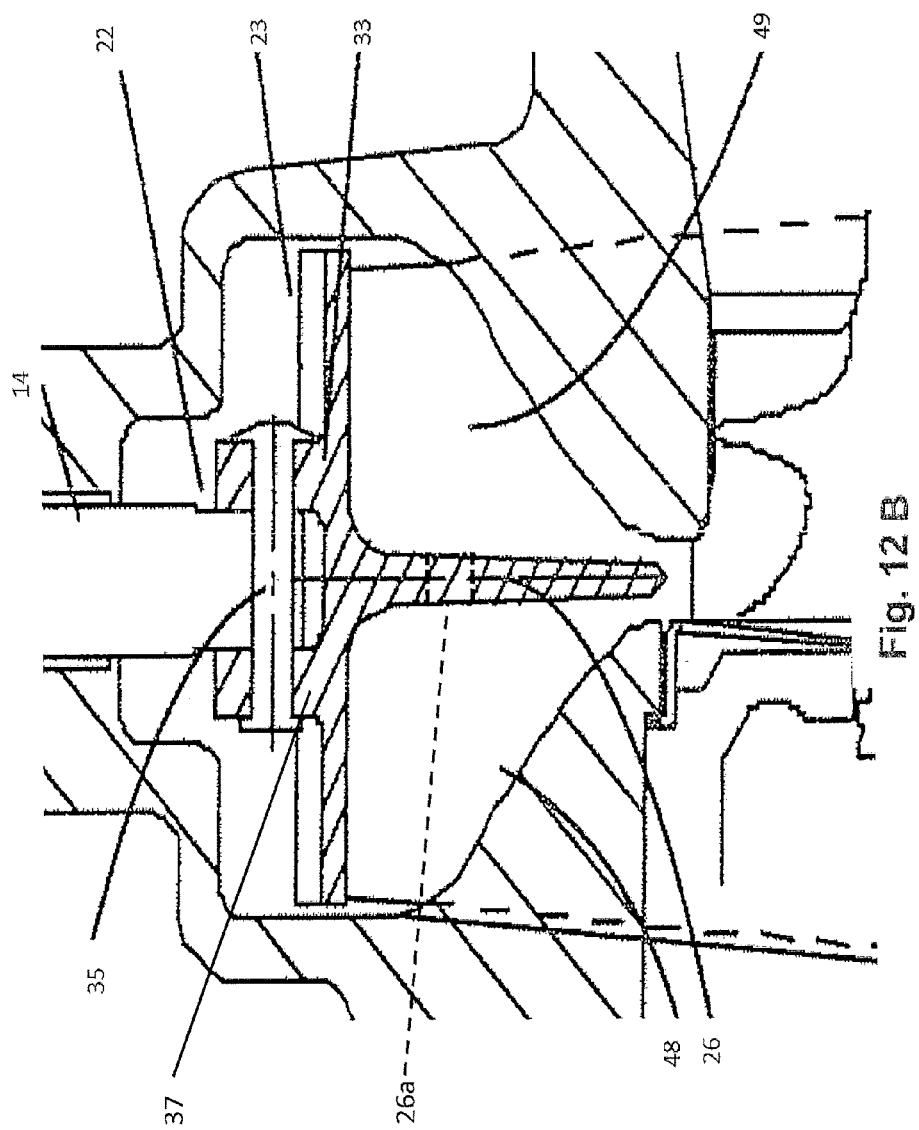

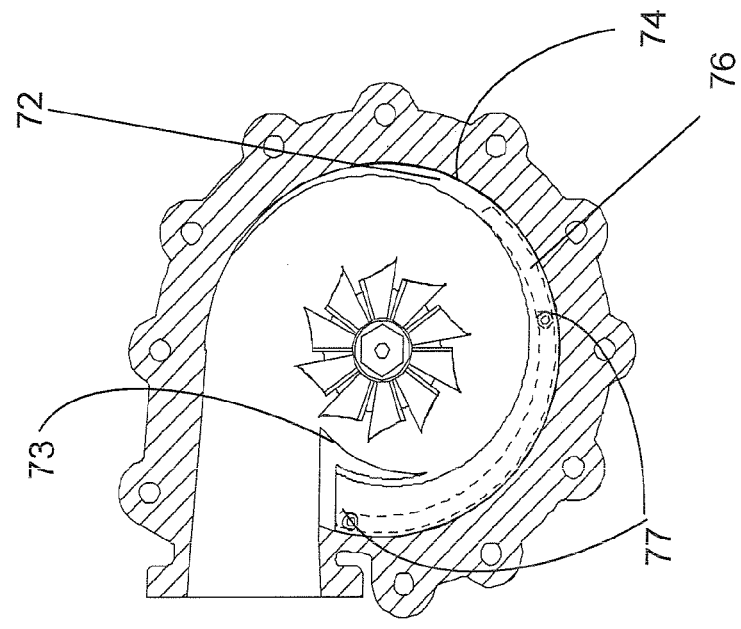
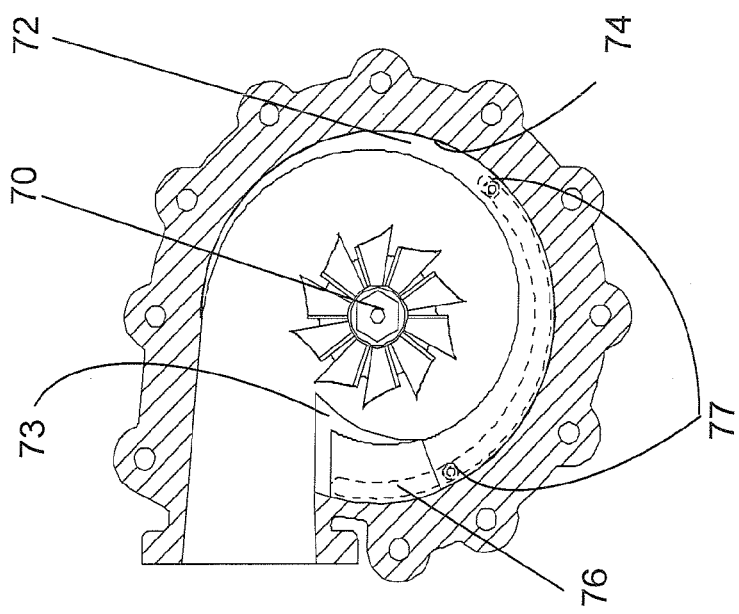
Fig. 16A
Fig. 16B

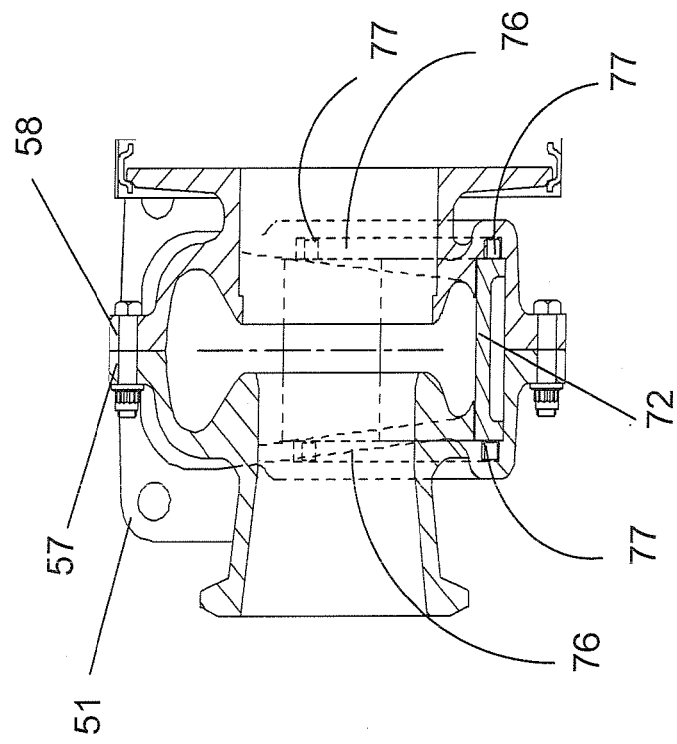
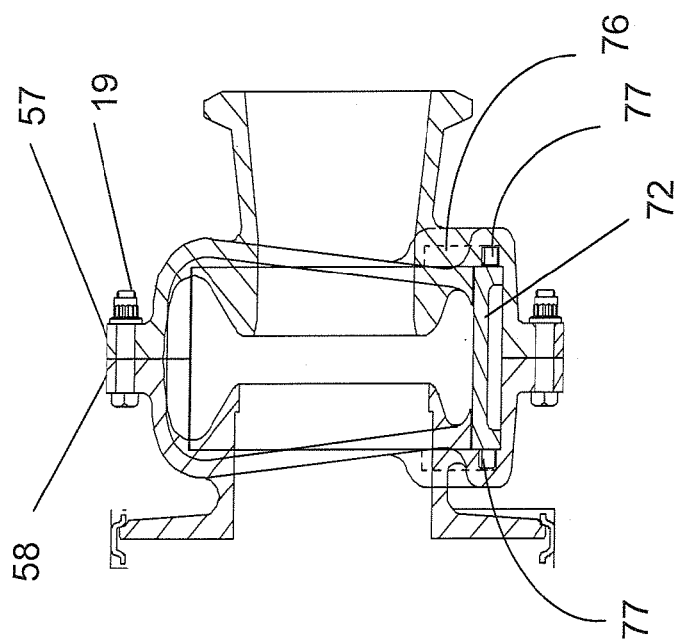
Fig. 18B C-C
Fig. 18A D-D

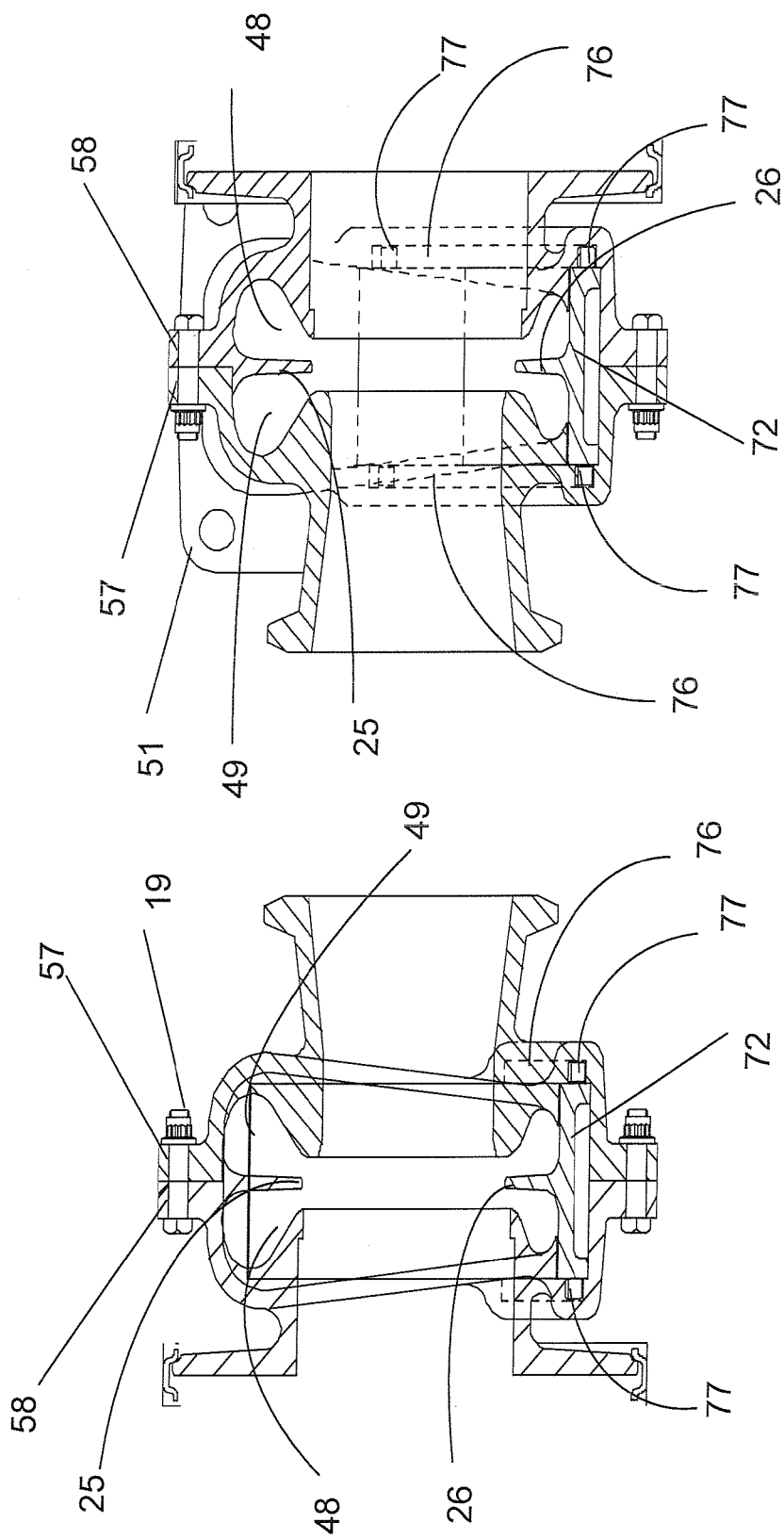

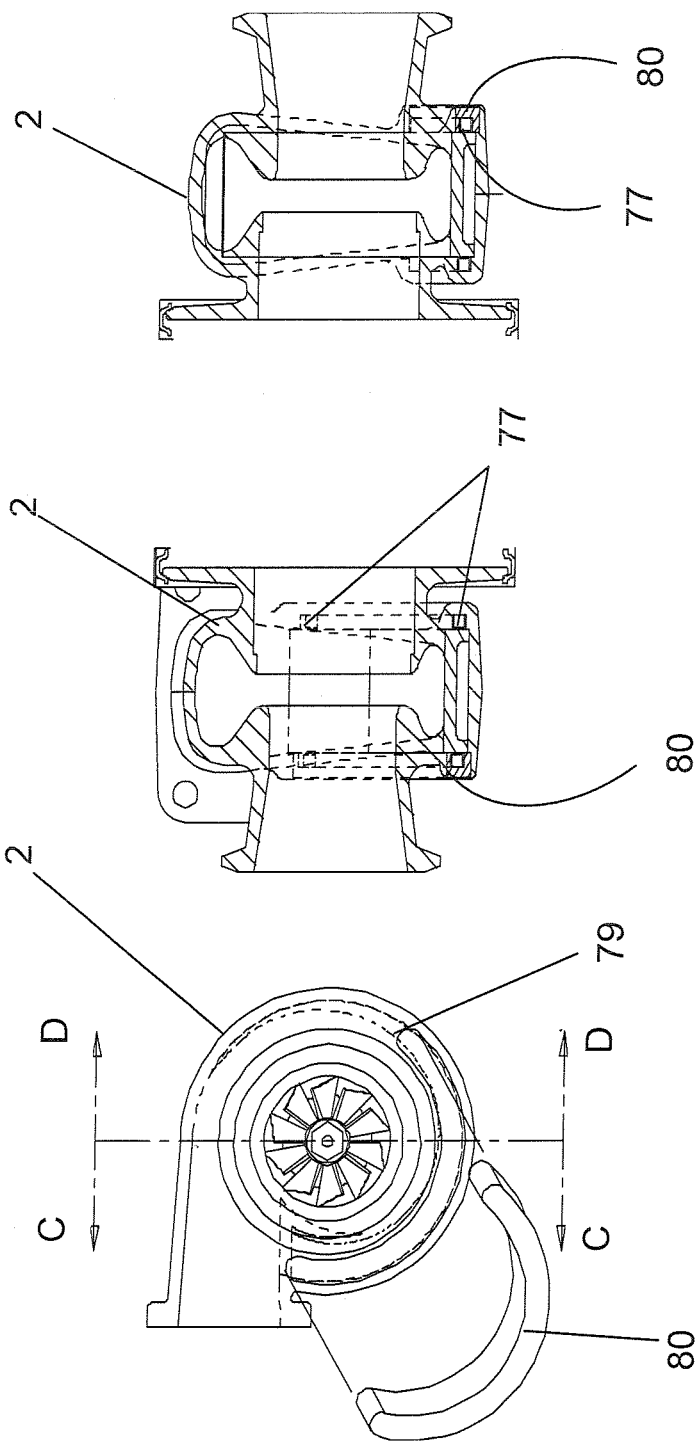

SIMPLIFIED VARIABLE GEOMETRY TURBOCHARGER WITH VARIABLE FLOW VOLUMES

FIELD OF THE INVENTION

This invention addresses the need for a low cost turbine flow device able to maintain pulse energy, and accomplishes this by designing a simplified variable geometry turbocharger housing with variable volute flow volumes.

BACKGROUND OF THE INVENTION

Turbochargers are a type of forced induction system. They deliver air, at greater density than would be possible in the normally aspirated configuration, to the engine intake, allowing more fuel to be combusted, thus boosting the engine's horsepower without significantly increasing engine weight. This can enable the use of a smaller turbocharged engine, replacing a normally aspirated engine of a larger physical size, thus reducing the mass and aerodynamic frontal area of the vehicle.

Turbochargers (FIG. 1) use the exhaust flow (100), which enters the turbine housing at the turbine inlet (51) of a turbine housing (2), from the engine exhaust manifold to drive a turbine wheel (70), which is located in the turbine housing. The turbine wheel is solidly affixed to a shaft, the other end of which contains a compressor wheel (20) which is mounted to the shaft and held in position by the clamp load from a compressor nut. The primary function of the turbine wheel is providing rotational power to drive the compressor. Once the exhaust gas has passed through the turbine wheel (70) and the turbine wheel has extracted energy from the exhaust gas, the spent exhaust gas (101) exits the turbine housing (2) through the exducer (52) and is ducted to the vehicle downpipe and usually to the after-treatment devices such as catalytic converters, particulate and $NO_x$ traps.

The power developed by the turbine stage is a function of the expansion ratio across the turbine stage. That is the expansion ratio from the turbine inlet (51) to the turbine exducer (52). The range of the turbine power is a function of, among other parameters, the flow through the turbine stage.

The compressor stage consists of a wheel and its housing. Filtered air is drawn axially into the inlet (11) of a compressor cover (10) by the rotation of the compressor wheel (20). The power generated by the turbine stage to the shaft and wheel drives the compressor wheel (20) to produce a combination of static pressure with some residual kinetic energy and heat. The pressurized gas exits the compressor cover (10) through the compressor discharge (12) and is delivered, usually via an intercooler, to the engine intake.

The design of the turbine stage is a compromise among; the power required to drive the compressor at different flow regimes in the engine operating envelope; the aerodynamic design of the stage; the inertia of the rotating assembly, of which the turbine is a large part, since the turbine wheel is manufactured typically in Inconel, which has a density 3 times that of the aluminum of the compressor wheel; the turbocharger operating cycle, which affects the structural and material aspects of the design; and the near field both upstream and downstream of the turbine wheel with respect to blade excitation.

Part of the physical design of the turbine housing is a volute (47), the function of which is to control the inlet conditions to the turbine wheel such that the inlet flow conditions provide the most efficient transfer of power from the energy in the exhaust gas to the power developed by the turbine wheel, combined with the best transient response characteristics. Theoretically the incoming exhaust flow from the engine is delivered in a uniform manner from the volute to a vortex centered on the turbine wheel axis. To do this, ideally, the cross sectional area of the volute is at a maximum perpendicular to the direction of flow, gradually and continuously decreasing until it becomes zero. The inner boundary of the volute can be a perfect circle, defined as the base circle (71); or, in certain cases, such as a twin volute (48,49) as seen in FIG. 2, it can describe a spiral of minimum diameter not less than 106% of the turbine wheel diameter. The volute is defined by the decreasing radius of the outer boundary of the volute (45, 46) and by the inner boundary, as described above, in one plane defined in the "X-Y" axis as depicted in FIG. 4, and the cross sectional areas, at each station, in the plane passing through the "Z" axis, as depicted in FIGS. 8A and 8B. The "Z" axis is perpendicular to the plane defined by the "X-Y" axis and is also the axis of the turbine wheel.

For consistency of product design, a system is used in which the development of the volute initiates at slice "A", which is defined as the datum for the remainder of the volute. The datum, slice "A", is defined as the slice at an angle of "P" degrees above the "X-axis of the turbine housing containing the "X"-axis, "Y"-axis and "Z"-axis details of the volute shape.

The size and shape of the volute is defined in the following manner: The widely used term A/R represents the ratio of the partial area at slice "A" divided by the distance from the centroid (161) of the shaded flow area (160) to the turbo centerline. In FIGS. 8A and B, the centroids (161) determine the distance $R_A$ and $R_B$ to the turbo centerline. For different members of a family of turbine housings, the general shape remains the same, but the area at slice "A" is different, as is the distance $R_A$. The A/R ratio is generally used as the "name" for a specific turbine housing to differentiate that turbine housing from others in the same family (with different A/R ratios). In FIG. 8A, the volute is that of a reasonably circular shape. In FIG. 8B, the volute is that of a divided turbine housing which forces the shape to be reasonably triangular. Although the areas at slice "A" for both volutes are the same, the shapes are different, and the radii to the centroids are different (due to the volute shape), so the A/Rs will be different. Slice "A" is offset by angle "P" from the "X"-axis. The turbine housing is then geometrically split into equal radial slices (often 30°, thus at (30x+P°)), and the areas $(A_{A-M})$ and the radii $(R_{A-M})$, along with other geometric definitions, such as corner radii are defined. From this definition, splines of points along the volute walls are generated, thus defining the full shape of the volute. The wall thickness is added to the internal volute shape, and, through this method, a turbine housing is defined.

The theoretically optimized volute shape for a given area is that of a circular cross-section since it has the minimum surface area which minimizes the fluid frictional losses. The volute, however, does not act on its own, but is part of a system; so the requirements of flow in the planes from slice "A", shown in FIG. 4, to the plane at slice "M", and from "M" to the tongue, influence the performance of the turbine stage. These requirements often result in compromises such as architectural requirements outside the turbine housing, method of location and mounting of the turbine housing to the bearing housing, and the transition from slice "A" to the turbine foot (51), combine to force turbine housing volutes of rectangular or triangular section, as well as in circular, or combinations of all shapes. The rectangular shape of the volute in FIG. 1, showing a section "D-K", is a result of the requirement to not only to fit VTG vanes into the space such that the flow is optimized through the vanes and that the vanes can be moved and controlled by devices external to the turbine housing, but also to minimize the outline of the turbine housing so the turbocharger fits on an engine.

The turbine housing foot is usually of a standard design as it mates to exhaust manifolds of many engines. The foot can be located at any angle to, or position relative to, the "volute". The transition from the foot gas passages to the volute is executed in a manner which provides the best aerodynamic and mechanical compromise.

The roughly triangular shape of the volutes in FIG. 2, taken at the same sections as those above, is the more typical volute geometry for fixed and wastegated turbine housings. The addition of the divider wall (25) is to reduce aerodynamic "cross-talk" between the volutes in an effort to maintain pulse flow, from a divided manifold, to harvest the pulse energy in the work extracted by the turbine wheel. The pressure pulses in the exhaust manifold are a function of the firing order of the engine.

Turbine housings are typically designed in families (typically up to 5 in a family) which, in a given family, use turbine wheels of the same diameter, or a group of wheels with close to the same diameter. They may use the same turbine foot size. For example, a family of turbine housings for a 63 mm turbine wheel may cover a range of A/Rs from 1.8 to 2.2. FIG. 5 depicts the area schedule for three volutes of a family. The largest volute is a 1.2 A/R volute, shown by the dotted line (45). The smallest volute is a 0.8 A/R volute; shown by the dashed line (46), and the mean volute, in the middle of the family, shown by the solid line. The X-axis depicts the angle of the slice from 30° (section "A") to 360° (the tongue); the Y-axis depicts the area of the section at the respective angle. Typically there is an 8 to 10% difference in cross-sectional area (in the given case with 12 areas), at slice "A", from one A/R to the next A/R in a design family.

Some turbine wheels are specifically designed to harness this pulse energy and convert it to rotational velocity. Thus the conversion of pressure and velocity from the exhaust gas for a pulse flow turbine wheel in a divided turbine housing is greater than the conversion of pressure and velocity from a steady state exhaust flow to the turbine wheel velocity. This pulse energy is more predominant in commercial Diesel engines, which operate at around 2200 RPM with peak torque at 1200 to 1400 RPM, than in gasoline engines, which operate at much higher rotational speed, often up to 6000 RPM, with peak torque at 4000 RPM. So the pulse is not as well defined.

The basic turbocharger configuration is that of a fixed turbine housing. In this configuration, the shape and volume of the turbine housing volute is determined at the design stage and cast in place.

The next level of sophistication is that of a wastegated turbine housing. In this configuration, the volute is cast in place, as in the fixed configuration above. In FIG. 2, the wastegated turbine housing features a port (54) which fluidly connects the turbine housing volute (49) to the turbine housing exducer (52). Since the port on the volute side is upstream of the turbine wheel (70), and the other side of the port, on the exducer side, is downstream of the turbine wheel, flow through the duct connecting these ports bypasses the turbine wheel (70), thus not contributing to the power delivered to the turbine wheel.

The wastegate in its most simple form is a valve (55) which can be a poppet valve. It can be a swing type valve similar to the valve in FIG. 2. Typically these valves are operated by a "dumb" actuator which senses boost pressure or vacuum to activate a diaphragm, connected to the valve, and operates without specific communication to the engine ECU. The function of the wastegate valve, in this manner, is to cut the top off the full load boost curve, thus limiting the boost level to the engine. The wastegate configuration has no effect on the characteristics of the boost curve until the valve opens. More sophisticated wastegate valves may sense barometric pressure or have electronic over-ride or control, but they all have no effect on the boost curve until they actuate to open or close the valve.

FIG. 6A depicts the boost curve (65) for a fixed turbine housing. The X axis (60) depicts expansion ratio, the Y axis (61) depicts the pressure ratio FIG. 6B depicts the boost curve (67) for a wastegated turbine housing of the same A/R as that for FIG. 6A or a wastegated turbine housing in which the wastegate valve did not open. In FIG. 6B, it can be seen that the shape of the boost curve (67) is exactly the same as the boost curve (65) in FIG. 6A to the point (66) at which the valve opens. After this point, the boost curve is flat. While a wastegate can be used to limit boost levels, its turbine power control characteristics are rudimentary and coarse.

A positive byproduct of wastegated turbine housings is the opportunity to reduce the A/R of the turbine housings. Since the upper limit of the boost is controlled by the wastegate, a reduction in A/R can provide better transient response characteristics. If the wastegated turbocharger has a "dumb" actuator, which operates on a pressure or vacuum signal only and is operated at altitude, then the critical pressure ratio at which the valve opens is detrimentally affected. Since the diaphragm in the actuator senses boost pressure on one side and barometric pressure on the other, the tendency is for the actuator to open later (since the barometric pressure at altitude is lower than that at sea level) resulting in over-boost of the engine.

Engine boost requirements are the predominant drivers of compressor stage selection. The selection and design of the compressor is a compromise between: the boost pressure requirement of the engine; the mass flow required by the engine; the efficiency required by the application; the map width required by the engine and application; the altitude and duty cycle to which the engine is to be subjected; the cylinder pressure limits of the engine; etc.

The reason this is important to turbocharger operation is that the addition of a wastegate to the turbine stage allows matching to the low speed range with a smaller turbine wheel and housing. Thus, the addition of a wastegate brings with it the option for a reduction in inertia. Since a reduction in inertia of the rotating assembly typically results in a reduction of particulate matter (PM), wastegates have become common in on-highway vehicles. The problem is that most wastegates are somewhat binary in their operation, which does not fit well with the linear relationship between engine output and engine speed.

The next level of sophistication in boost control of turbochargers is the VTG (the general term for variable turbine geometry). Some of these turbochargers have rotating vanes; and some have sliding sections or rings. Some titles for these devices are: variable turbine geometry (VTG), variable geometry turbine (VGT), variable nozzle turbine (VNT), or simply variable geometry (VG).

VTG turbochargers utilize adjustable guide vanes, FIGS. 3A and 3B, rotatably connected to a pair of vane rings and/or the nozzle wall. These vanes are adjusted to control the exhaust gas backpressure and the turbocharger speed by modulating the exhaust gas flow to the turbine wheel. In FIG. 3A, the vanes (31) are in the minimum open position. In FIG. 3B, the vanes (31) are in the maximum open position. The vanes can be rotatably driven by fingers engaged in a unison ring, which can be located above the upper vane ring. For the sake of clarity, these details have been omitted from the drawings. VTG turbochargers have a large number of very expensive alloy components, which must be assembled and positioned in the turbine housing so that the guide vanes remain properly positioned with respect to the exhaust supply flow channel and the turbine wheel over the range of thermal operating conditions to which they are exposed. The temperature and corrosive conditions force the use of exotic alloys in all internal components. These are very expensive to procure, machine, and weld (where required). Since the VTG design can change turbocharger speed very quickly, extensive software and controls are a necessity to prevent unwanted speed excursions. This translates to expensive actuators. While VTGs of various types and configurations have been adopted widely to control both turbocharger boost levels and turbine backpressure levels, the costs of the hardware and implementation are high.

If one considers a wastegated turbo as a baseline for cost, then the cost of a typical VTG, in the same production volume, is from 270% to 300% the cost of the same size, fixed, turbocharger. This disparity is due to a number of pertinent factors from the number of components, the materials of the components, the accuracy required in the manufacture and machining of the components, to the speed, accuracy, and repeatability of the actuator. The chart in FIG. 7 shows the comparative cost for the range of turbochargers from fixed to VTGs. Column "A" represents the benchmark cost of a fixed turbocharger for a given application. Column "B" represents the cost of a wastegated turbocharger for the same application, and column "C" represents the cost of a VTG for the same application.

Thus it can be seen that, for both technical reasons and cost drivers there needs to be a relatively low cost turbine flow control device which fits between wastegates and VTGs in terms of cost. The target cost price for such a device needs to be in the range of 145% to 165% that of a simple, fixed turbocharger.

SUMMARY OF THE INVENTION

The present invention relates to a simplified, low cost, turbine flow controlling device, which uses a pivoting volute outer wall, or a curved wedge segment, to control change the effective flow volume of exhaust flow in the turbine housing.

BRIEF DESCRIPTION OF THE DRAWINGS

The present invention is illustrated by way of example and not limitation in the accompanying drawings in which like reference numbers indicate similar parts, and in which:

FIGS. 3A,B depict a pair of sections of a typical VTG turbocharger;

FIG. 12A depicts a view of the section B-B of FIG. 11A;

FIG. 12B depicts a view of an alternate embodiment of the section B-B of FIG. 11A.

FIGS. 16A,B depict two views showing the guide grooves;

FIGS. 18A,B depict two sections C-C, and D-D of FIG. 17;

FIGS. 19A,B depict two sections C-C, and D-D of FIG. 17 with divider walls;

FIGS. 20A,B,C depict and end view and sections of the first variation of the second embodiment of the invention;

DETAILED DESCRIPTION OF THE INVENTION

Figure 1:
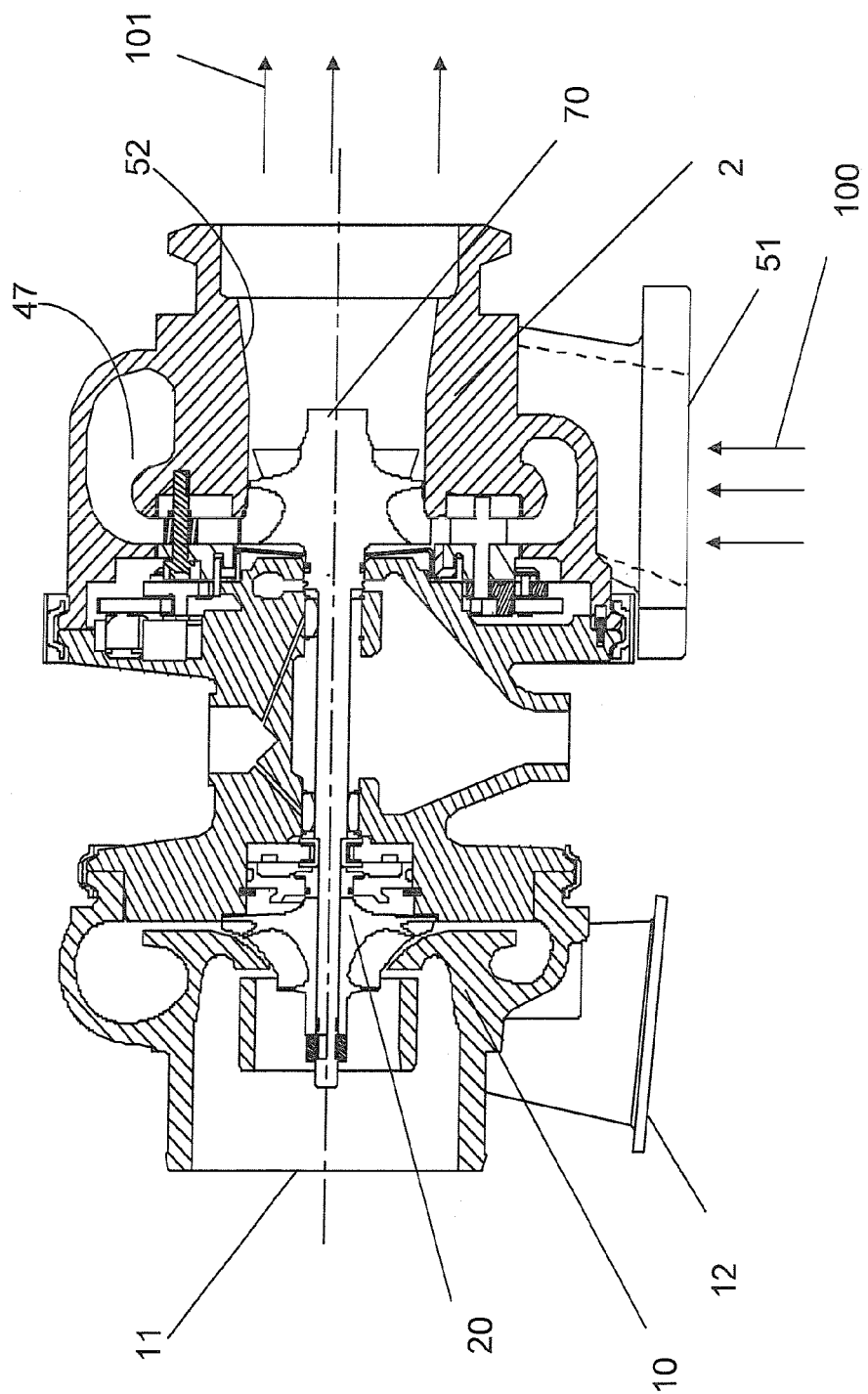
FIG. 1 depicts the section for a typical VTG turbocharger.
Figures 2A, 2B:
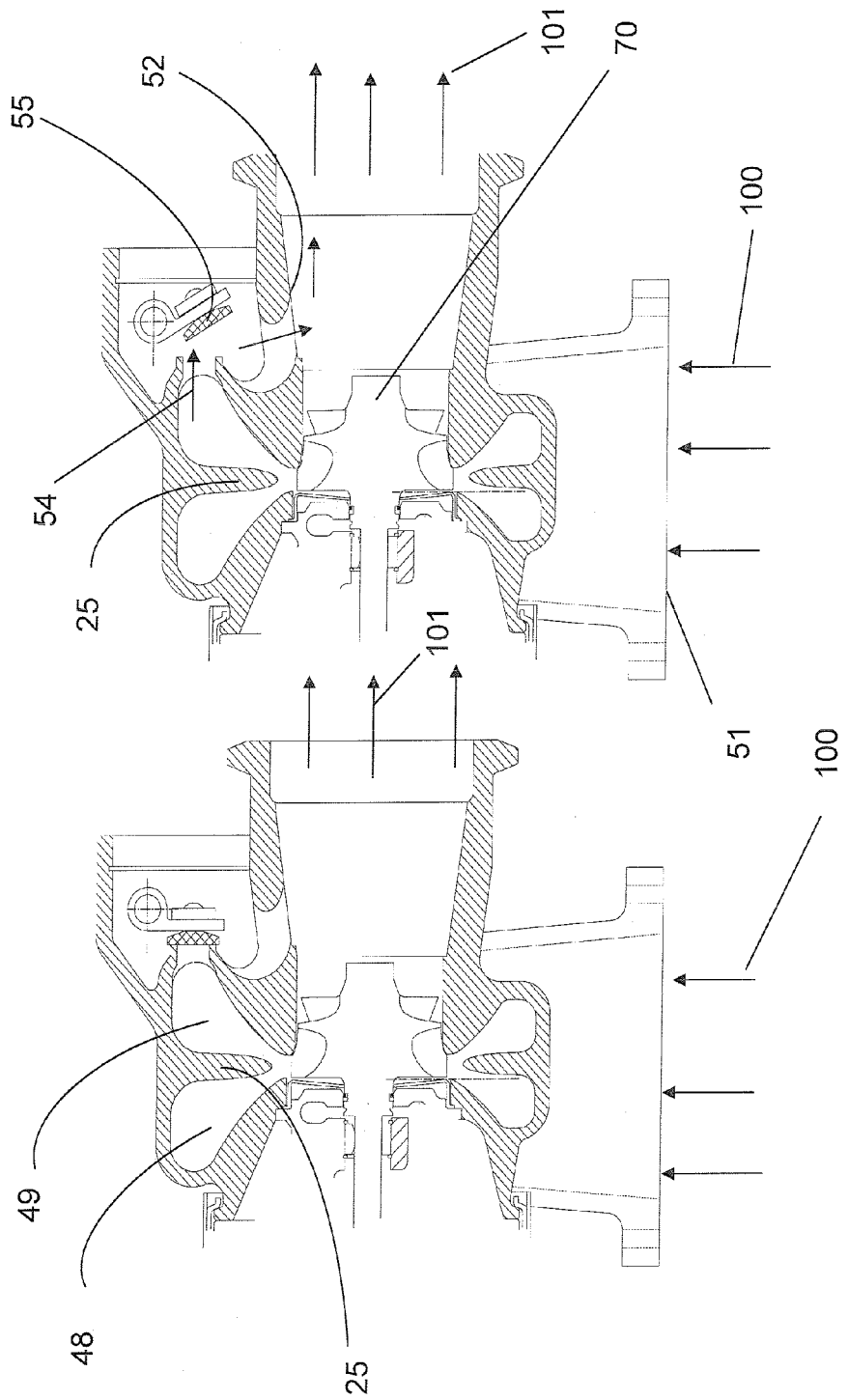
FIGS. 2A, 2B depict a pair of sections of a typical wastegated turbocharger.
Figure 4:
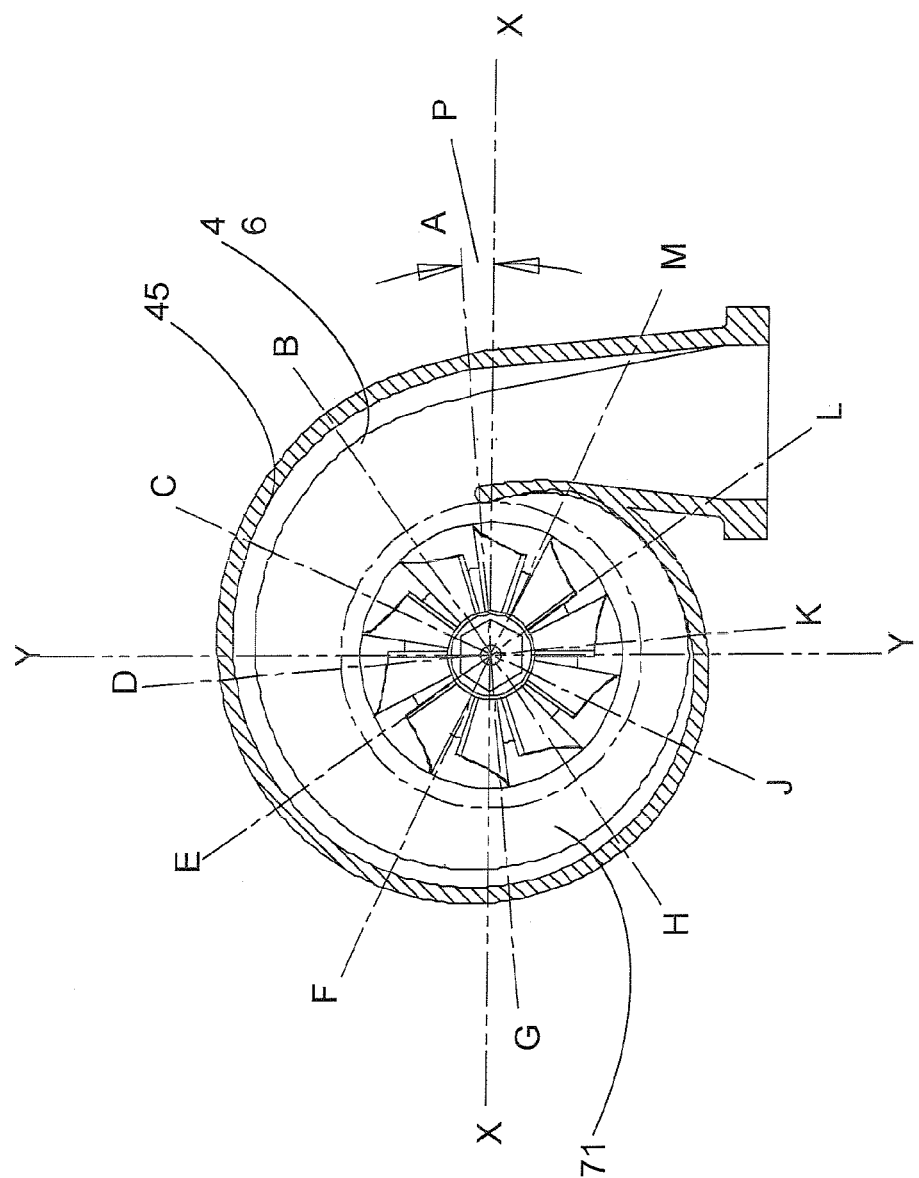
FIG. 4 depicts a section of a typical fixed turbine housing showing construction radial lines.
Figure 5:
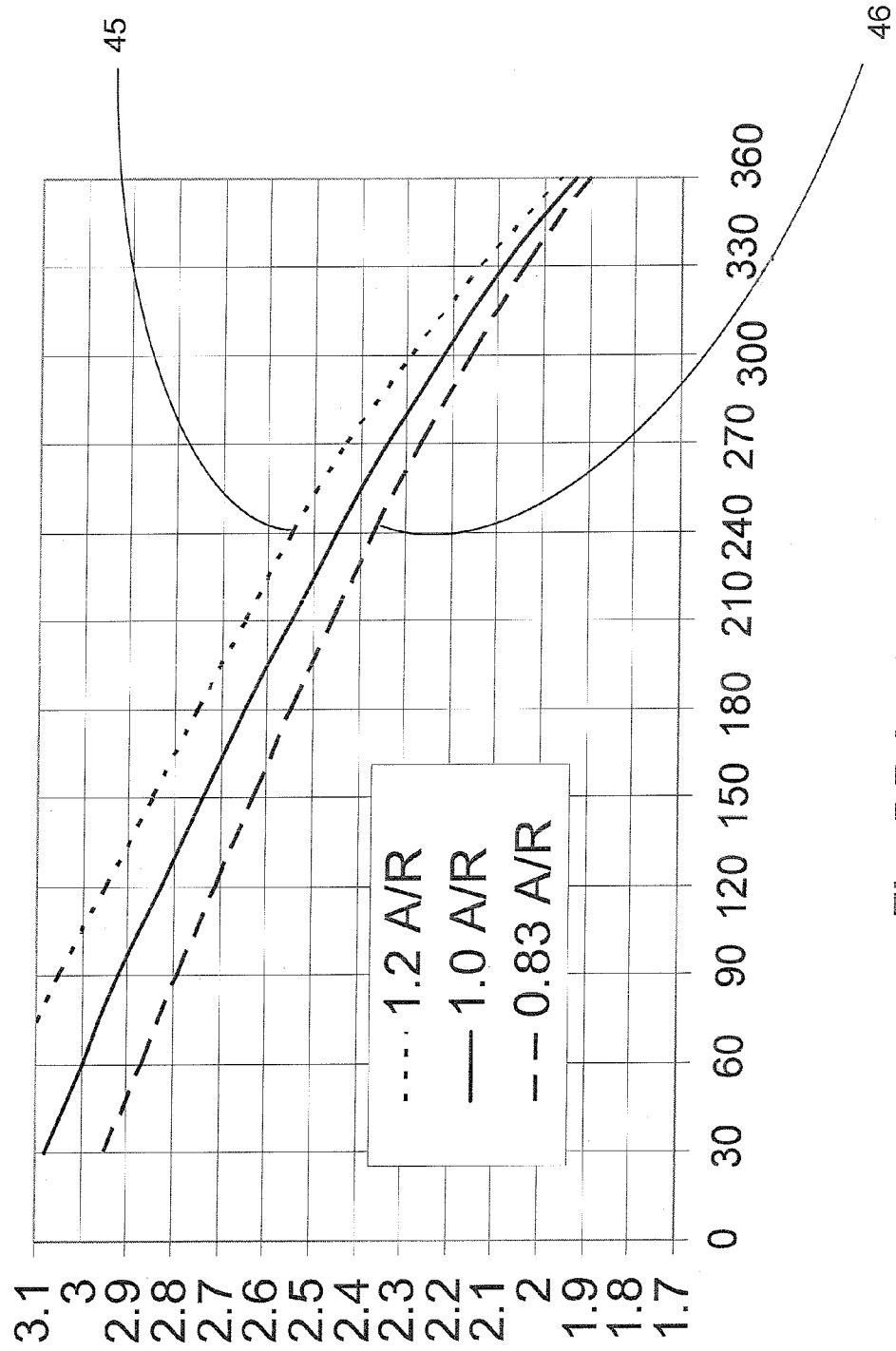
FIG. 5 is a chart of cross-sectional area development.
Figure 6:
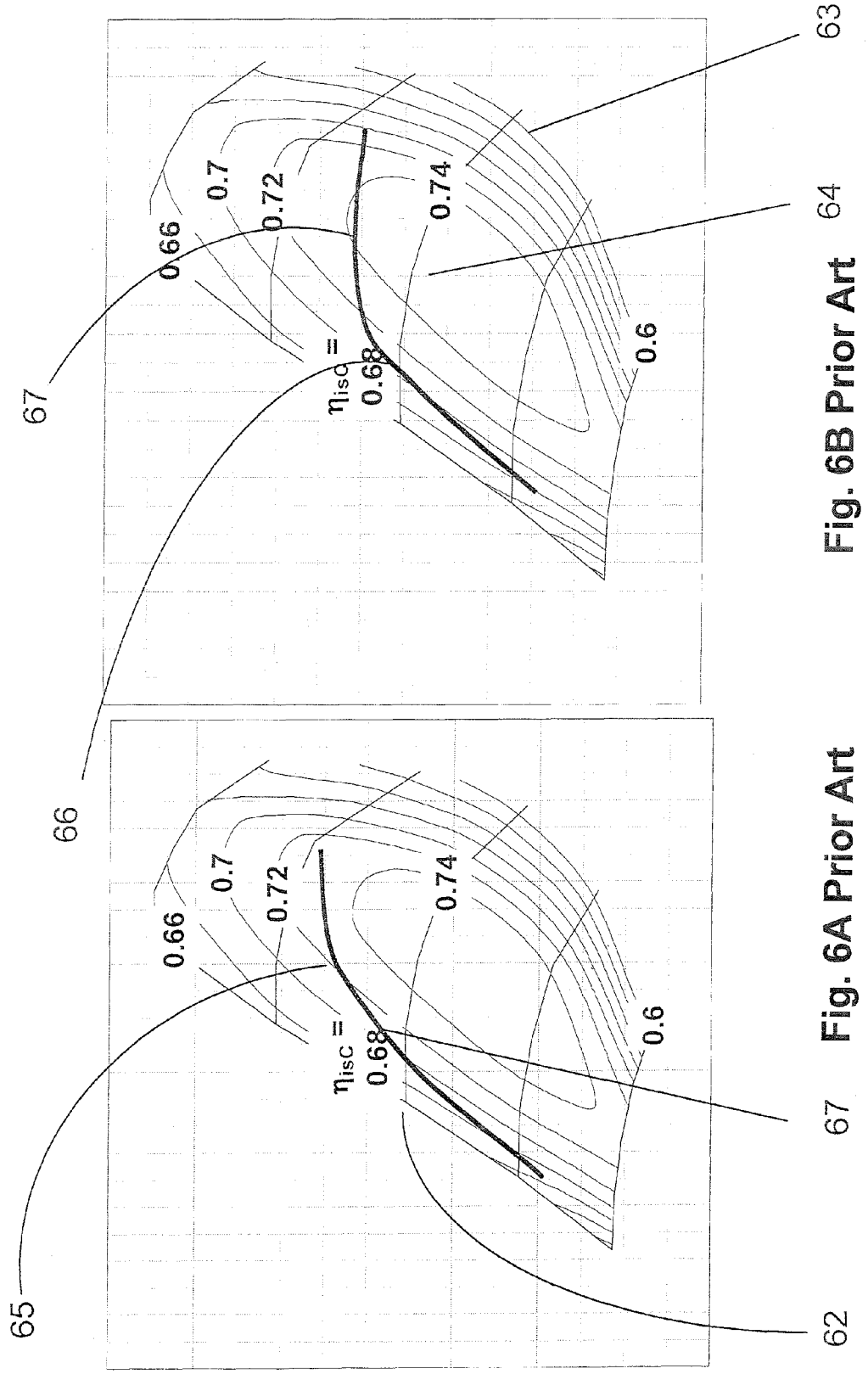
FIGS. 6A, 6B depict the compressor maps for a typical fixed, and a wastegated turbocharger.
Figure 7:
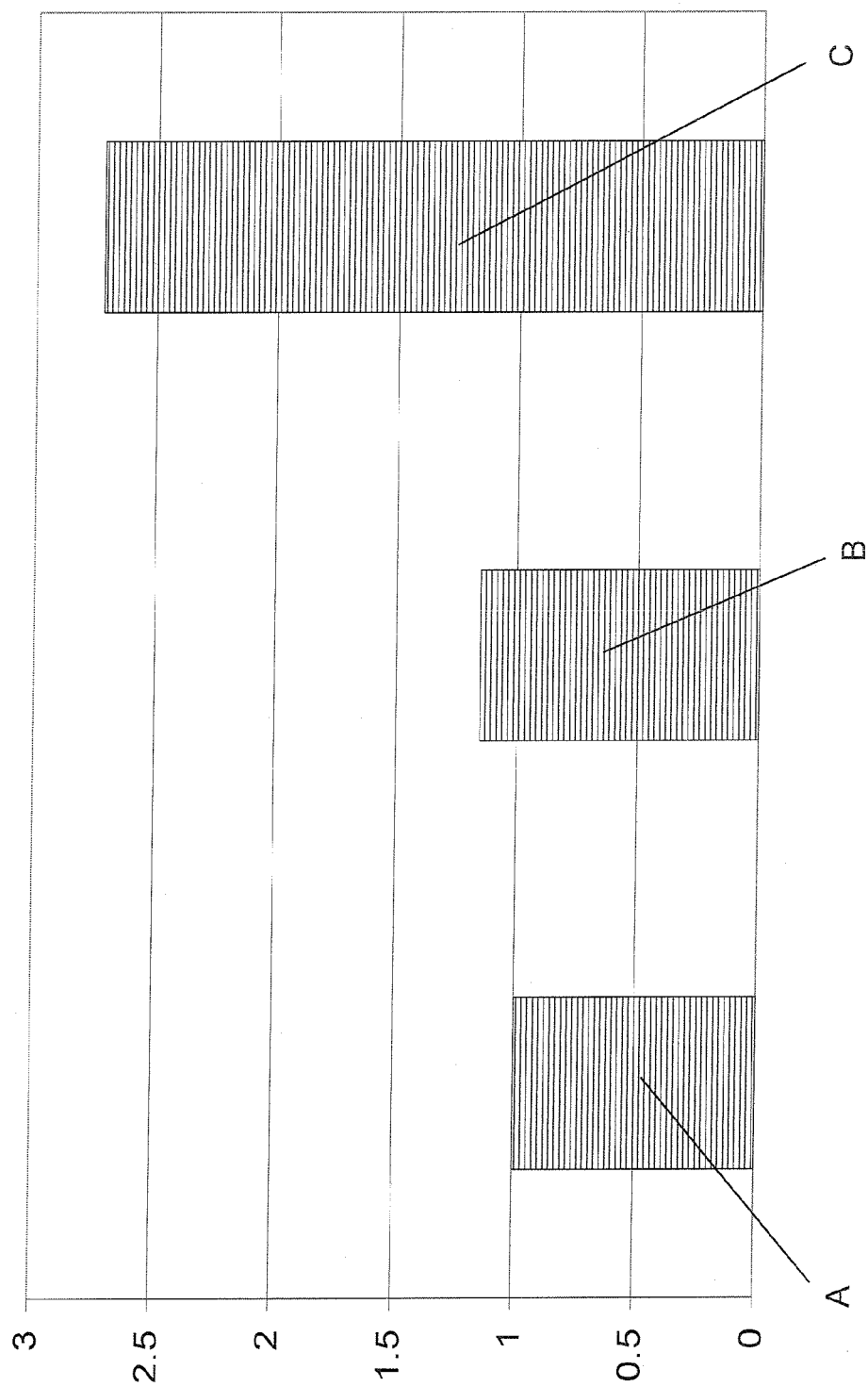
FIG. 7 is a chart showing turbocharger relative costs.
Figure 8:
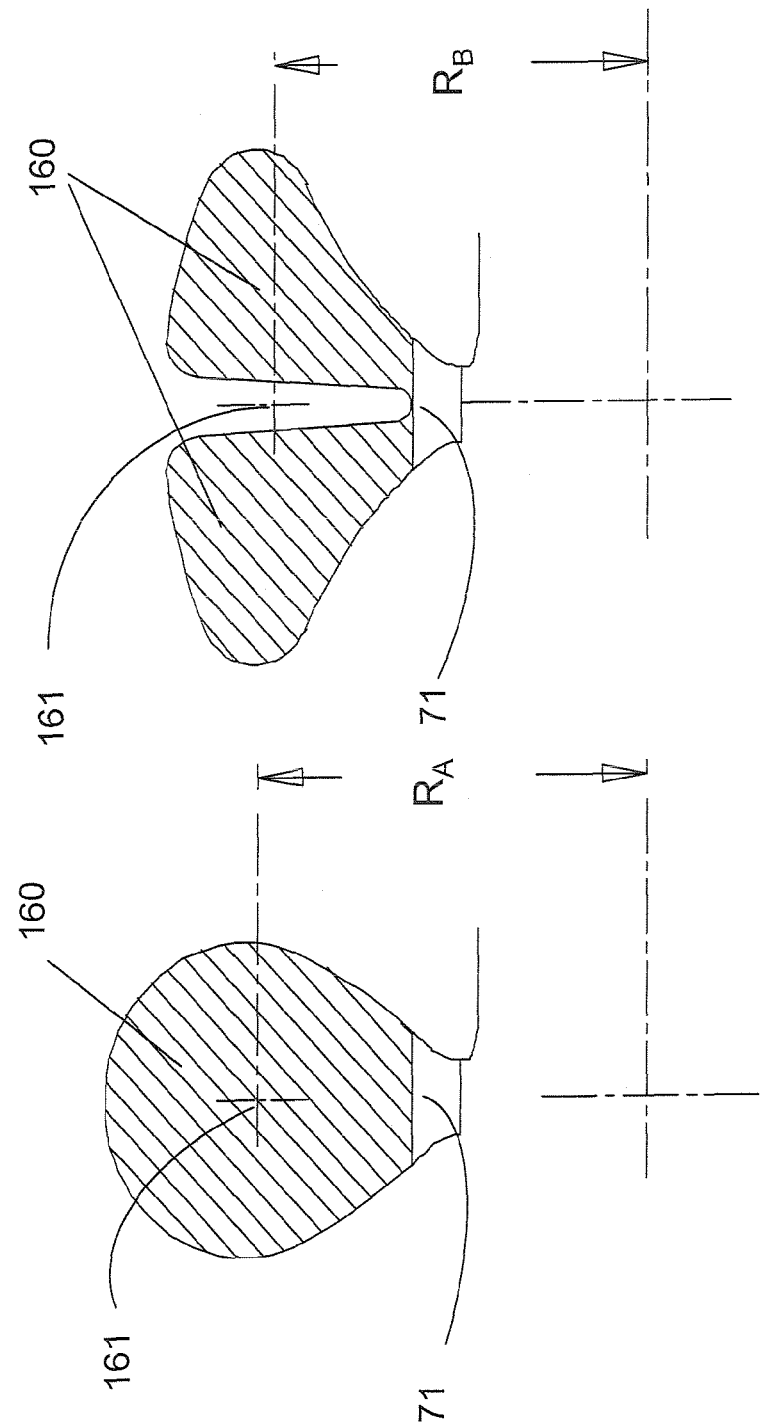
FIGS. 8A, 8B depict the sections of two volute types at slice "A"

The use of multiple vanes, "wetted" by the exhaust flow, and the mechanisms to control and move said vanes add tremendous cost. This increase doubles and more the cost of the basic turbocharger. Because the use of vanes results in very expensive turbochargers and the use of vanes cause attenuation of the pulse flow component available in the exhaust flow, the inventors sought the ability to modulate the exhaust flow to the turbine wheel in a cost-effective manner while maintaining the pulse energy in the exhaust flow. Therefore the inventors produced designs with one or more sliding or pivoting volute radially outer walls to provide both a cost and technically effective alternative for controlling the flow of exhaust gas to the turbine. In addition to the above gains, the inventors sought to provide a turbocharger matched to low flow regimes that would provide optimized turbo (and thus engine) transient response for low flow while capable of delivering the high flows demanded by the engine in other than low flow conditions in the same, cost-effective turbocharger.

When a turbocharger is matched to the maximum flow requirement of an engine, the flow requirements across the entire engine operating regime are met. The problem is that matching the turbocharger to the maximum flow requirement means that the size of the turbine housing volute (and thus flow) is way too large for low engine flow regimes. The turbocharger's transient response characteristics are sluggish because the entire volute has to be filled in order to deliver flow to the turbine wheel. Since reducing the A/R of a turbocharger turbine housing to match the low flow requirement would mean that the turbocharger, operating within typical speed constraints, is not capable of providing sufficient flow for the high flow requirement of the upper end of the engine operating regimes, the inventors recognized the need to provide a novel variable geometry turbocharger. Considering the expense and the loss of pulse energy associated with prior art variable geometry turbochargers, the inventors sought to find a new, simple way to control the airflow through the turbine housing.

Turbine housing volute shapes and dimensions are defined by the area of section "A", and all features and dimensions downstream of section "A" are controlled by the features and dimensions at section "A". This system is used for consistency of design within the turbochargers designed and produced by a turbocharger manufacturer.

In accordance with the present invention, the inventors provide a novel turbine design able to approximate a change of shape of the volute, preferably approximating the change from one member of a family of turbine housings to the next member in the family, by effecting a change in the position of the volute outer wall.

The changing of the shape of the volute produces a change in the effective flow volume of the volute. The "effective flow volume" can be considered to be the volume surrounded by the surfaces wetted by the exhaust flow. That is, "dead zones" not participating in flow are not included in the "effective flow volume" even though they may strictly speaking constitute part of the displacement of the turbine housing. The effective flow volume is a product of flow dynamics and is a function of the way the turbine stage behaves. The present inventors realized that, to change the behavior of the turbine housing, or more precisely, of the volute, it was sufficient to change this "effective" volume of the volute. This could be done, for example, by providing the volute with a wall segment that is moveable, referred to hereafter as a "pivotable outer volute wall".

For example, with a pivotable outer volute wall constrained by an anchored upstream end and a free downstream end, which in a first position is nearer to, and preferably receded in, the volute outer wall, and in a second position is pivoted to move closer to the tongue and the turbine wheel, the behavior of such a turbocharger is determined almost exclusively by the space radially inward of the pivotable outer volute wall, i.e., the "effective flow volume" of the turbine. That is, in the second position the space between the pivotable outer volute wall and the turbine housing wall becomes an effective "dead zone". This change in the position of the volute outer wall thus produces a change in effective shape of the volute of, and thus a change in the behavior of, the turbocharger.

By controlling the effective flow volume of the turbine housing the inventors sought to control the mass flow of gas passing through the turbine housing to the turbine wheel. When the engine requirement is in the low speed, low load condition, the boost level required to match those conditions is relatively low. When the engine requirement is in the high speed, high load condition, the boost level required to meet those engine conditions is high. When the engine is transitioning from low load conditions to high load conditions, the turbocharger is required to supply an increasing volume of air at an increasing pressure ratio. Since the compressor stage is driven by the turbine stage, the mass flow of exhaust required to meet the engine (and thus the compressor) requirements has to change. At the low load, low speed engine condition, the engine exhaust output, in terms of mass flow is low. At the high load, high engine speed condition, the engine output, in terms of mass flow is high. In the transition stage the exhaust mass flow has to change from low to high.

The problem is that the turbine stage must be matched to both engine conditions to allow the turbocharger to supply the requested flow and pressure ratio at either condition. In order to force the turbocharger to change speed quickly, one, experienced in the art matches the turbocharger with a small A/R turbine housing. In order to supply the required flow and pressure ratio at the high load, high speed condition one matches the turbocharger with a larger A/R turbine housing. The former small A/R turbine housing will provide good transient response characteristics, but insufficient mass flow to the turbine stage to generate the high speed, high load compressor requirement. The latter, large A/R turbine housing will provide the mass flow requirement to the turbine stage for the high speed, high load boost requirement but will not provide acceleration to the turbine wheel sufficiently quickly to produce acceptable transient response.

A properly matched small A/R turbine stage will provide acceptable transient response albeit at the expense of higher backpressure, compared to that of a turbine stage matched to the high load, high speed condition. In a non-EGR engine having high back pressure is a negative to the pressure differential across the engine and thus the efficiency of the engine. In a high pressure loop EGR engine configuration (as against a low pressure loop EGR engine configuration) the high back pressure in the exhaust system is necessary to drive the exhaust gas from the exhaust side of the engine into the inlet side of the engine which is seeing boost pressure. A large turbine housing A/R for a given set of engine parameters will develop lower exhaust back pressure than would a smaller A/R turbine housing under the same set of engine parameters. So being able to change the effective A/R of the turbine housing allows a single turbocharger to meet both the requirements of a low speed, low load condition, and a high speed, high load condition.

By controlling the mass flow of exhaust, which the turbine housing directs to the turbine wheel, with a pivotable outer volute wall, both conditions can be cost-effectively met with a single turbine housing.

In the low flow condition, the pivotable outer volute wall is pivoted inward, reducing the mass flow through the space, i.e., reducing the effective volume of the volute. The inward movement of the pivotable outer volute wall causes the shape of the trailing portion of the pivotable outer wall, downstream of the tongue in the turbine housing, to direct the flow of exhaust gas more acutely towards the turbine wheel. (The inward movement of the curved trailing end of the moveable volute also has the effect of directing the flow of exhaust gas closer to the turbine wheel.) These two effects result in the change in behavior of the turbocharger.

Figure 23:
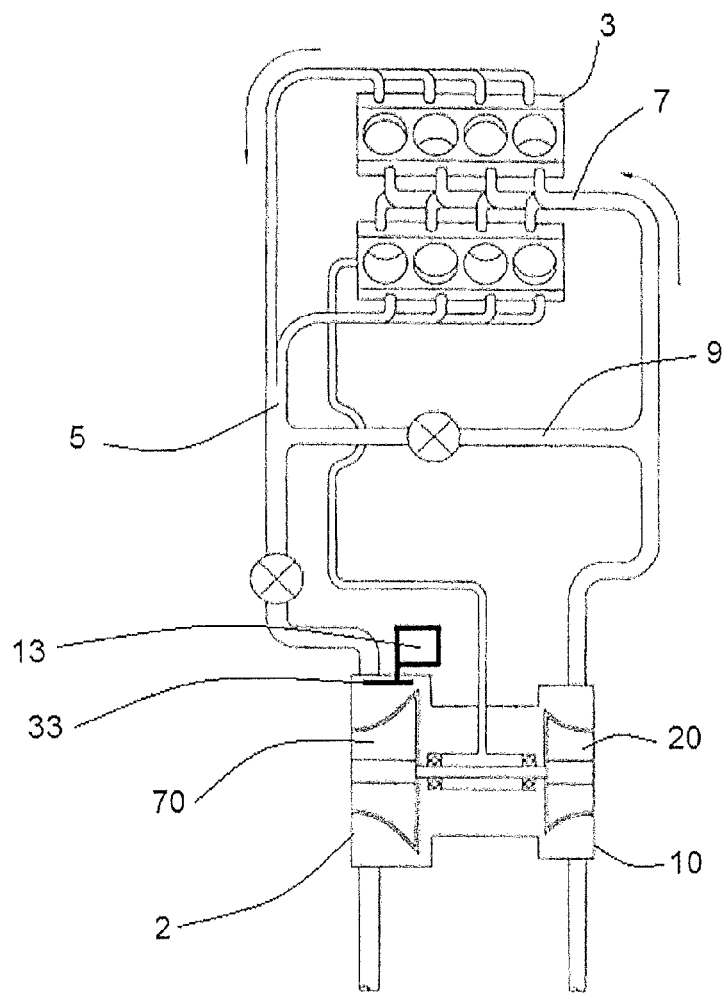
FIG. 23 depicts an engine exhaust system including an engine, a turbocharger and a high pressure exhaust gas recirculation loop.

The inventors realized that the ratio of boost to backpressure as well as the backpressure alone increased as a function of engine speed and load, at both sea level and at altitude, which made the backpressure in the exhaust system an ideal controlling parameter for determining the target position of a pivotable outer volute wall. When the pivotable outer volute wall is in the extended position, the turbine housing acts as if it was a smaller A/R turbine housing, than would exist with the pivotable outer volute wall in the retracted position. This causes the exhaust backpressure to rise which is necessary for EGR flow from the exhaust side (5) of the engine (3), to the inlet side (7) of the engine, is required. For example, in the engine exhaust system illustrated in FIG. 23, an EGR line (9) extends between the exhaust side (5) of the engine (3) to the inlet side of the engine (3), and depending on the position of the pivotable volute outer wall (33), high pressure EGR can be provided to the engine (3) via the EGR line 9. Thus the movement of the pivotable outer volute wall can be used to develop a pressure differential (from the exhaust side (5) of the engine (3), to the inlet side (7) of the engine (3)) to aid EGR flow from the exhaust side (5) of the engine (3) to the inlet side (7) of the engine (3).

In the first embodiment of the invention, the effective flow volume of the volute is controlled by a radially outer wall of the volute which pivots or moves from an anchor point near the turbine housing inlet or foot. In this embodiment the position of the moving wall is controlled by the net effect of the pressure of the exhaust gas in the volute (the backpressure), reacted against by the seat and spring rate of a spring. When the engine is operating at low flow rates, the net effect of the opposing forces is that the actuator rod is extended by the spring, and the pivotable outer wall is urged into the volute, thus reducing the effective flow volume through the volute. When the engine is operating at high flow rates, producing high back pressure, the net force effect is that the actuator spring is compressed by the pressure acting on the pivotable outer volute wall. The pivotable outer volute wall retracts into its cavity, and the effective flow volume in the volute is increased to that equivalent of a larger sized (A/R) fixed turbine housing without the pivotable outer wall.

Figure 9:
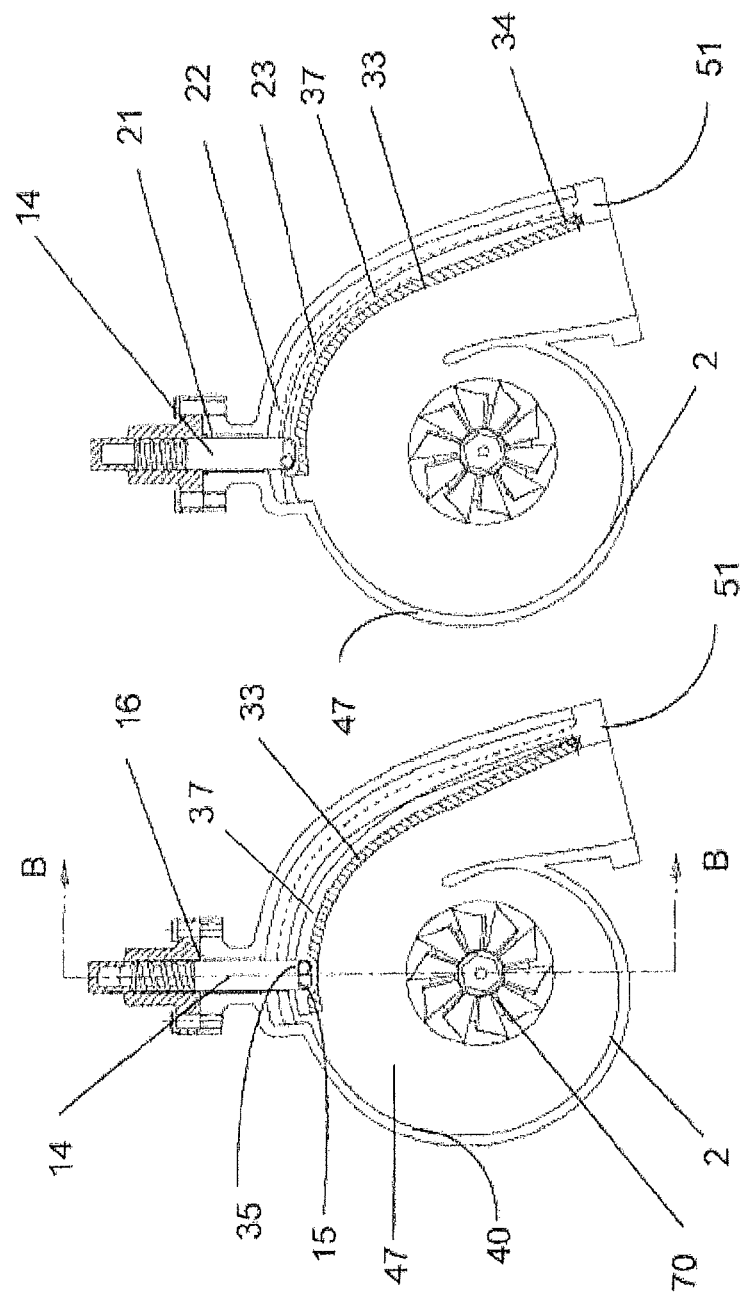
FIGS. 9A,B depict two views of a pivoting outer volute wall, in two positions.

In FIG. 9A, a turbine housing (2) is depicted in the low engine exhaust flow mode. The pivotable outer volute wall (33) is shown with the actuator shaft (14) in the extended position such that exhaust flow entering the turbine housing through the turbine housing foot (51) effectively has less volume through which to flow than in the case of the example in FIG. 9B, simulating a larger displacement turbine volute. In FIG. 9B, the pivotable outer volute wall (33) is in the retracted position. Thus the effective flow volume for exhaust gas in the turbine housing is at its maximum, simulating a larger A/R turbine housing volute.

The pivotable volute wall (33) is constrained in the turbine housing by the pivot pin (34) which mounts the pivotable outer volute wall to the turbine housing (2), while allowing said pivotable volute wall to pivot about the pivot pin. On the other end of the pivotable outer volute wall, the actuator shaft (14) attaches to the pivotable outer volute wall using a fastener (35) which is free to slide laterally in a slot (15) in the actuator shaft. The slot allows for the difference in lateral displacement due to the fact that the volute outer wall pivots about its lower pivot pin (34) while the actuator shaft slides up and down in a bearing (36).

Figure 10:
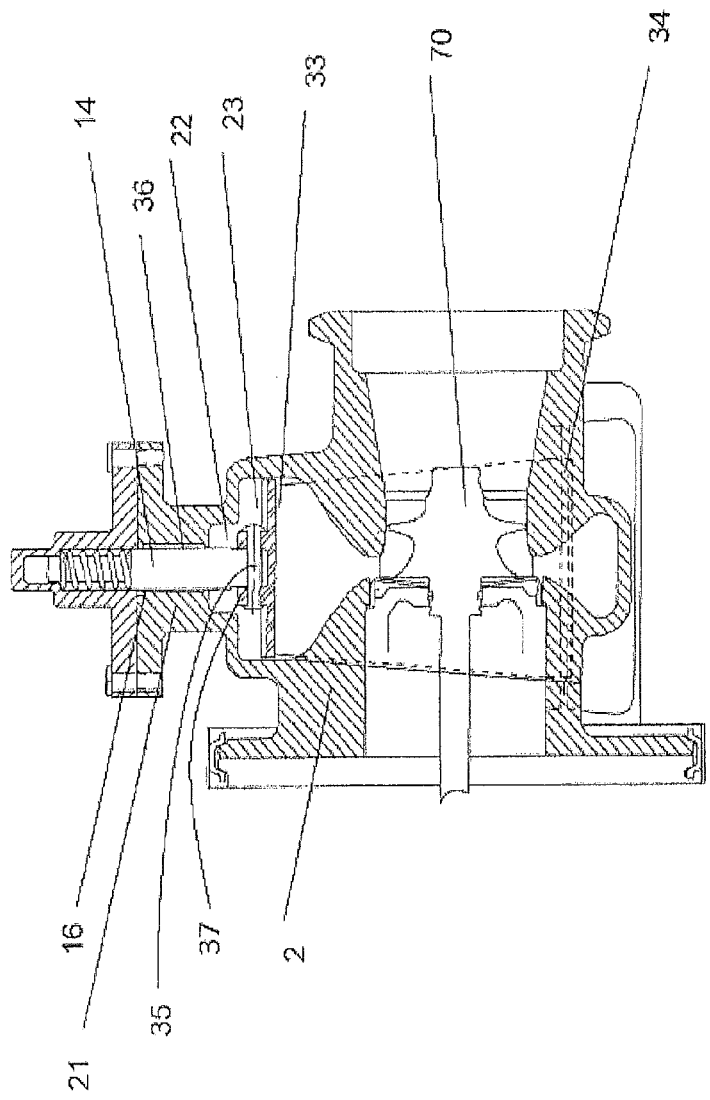
FIG. 10 depicts a view of section B-B of FIG. 9A.

As can be seen in FIG. 10, which shows section B-B of FIG. 9A, a typical turbocharger piston ring seal (16) resides in a groove in the actuator flange (21) upon which the actuator force mechanism housing resides. The piston ring is retained by the actuator force housing. The groove for the piston ring seal could also be fabricated into the actuator force housing and retained by the actuator flange (21). The piston ring seal (16) radially acts on the actuator shaft (14) to prevent leakage of exhaust gas to the environment.

For the target performance required of the first embodiment of the invention, the inventors defined the requirement for the change in effective flow volume by relating the volume of the turbine housing "wetted surfaces" to the change in volume of the turbine housing "wetted surfaces" between adjacent A/Rs in a family of turbine housings, which is 8 to 10% from a small A/R to the next larger A/R in a family. In the exemplary embodiment of the invention depicted in FIGS. 9A and 9B, the change in "wetted surface" volume is 8.8%. So with the pivotable outer volute wall extended as in FIG. 9A, the engine will have improved transient response, approximately equivalent to that provided by the same turbocharger but with the next smallest A/R turbine housing. And with the pivotable outer volute wall retracted as in FIG. 9B the turbocharger can supply the maximum mass flow of gas to the turbine wheel to generate the required boost level for the engine at, for example, the rated point.

This degree of change in volume could have been larger or smaller than those defined by the inventors for this particular product, and those changes in required mass flow or boost could be met by changing the size and/or displacement of the pivotable outer wall.

Of course, the invention is not limited to this 8-10% differential, and embodiments with 20 or 30%, and up to 50% differential in cross section, can be employed in practice. What is really important is mass flow or range of mass flow allowed to the TW, which is a design parameter, as discussed above, and then based on these parameters, the person working in this art can design the turbocharger taking advantage of the benefits of the present invention.

In some embodiments, at least one reinforcing rib (37) is provided on the pivotable volute wall. For example, at least one rib (37) protrudes from a radially outward-facing side of the pivotable volute wall (33), is elongated in a direction corresponding to a direction of exhaust gas flow through the turbine housing (2), and together with the pivotable volute wall (33) is movable relative to the radially outer wall of the volute (47) of the turbine housing (2). The turbine housing (2) contains relief areas (22 and 23) to allow the rib and general shape on the back of the pivoting volute wall to retract into the minimum position. The rib (37) was designed to provide stiffness so the pivoting outer wall could be cost-effectively cast in ductile iron, or the base material of the turbine housing. With the variation to the first embodiment, which has a volute divider wall, the rib (37) may no longer be required as the divider wall will provide the stiffness.

The shape and dimensions of the volute in the turbine housing are defined for the purposes of casting the turbine housing by using the dimensions and shapes defined for the larger of the A/Rs in question.

Figure 13A:
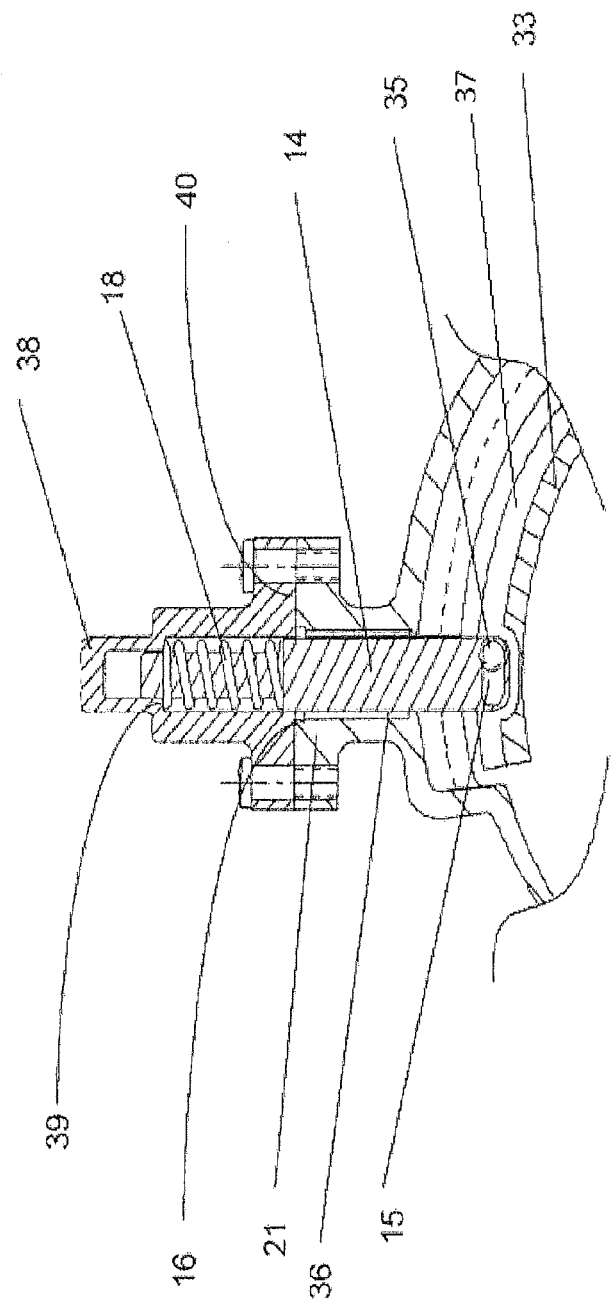
FIG. 13A depicts a section view of the actuator spring.
Figure 13B:
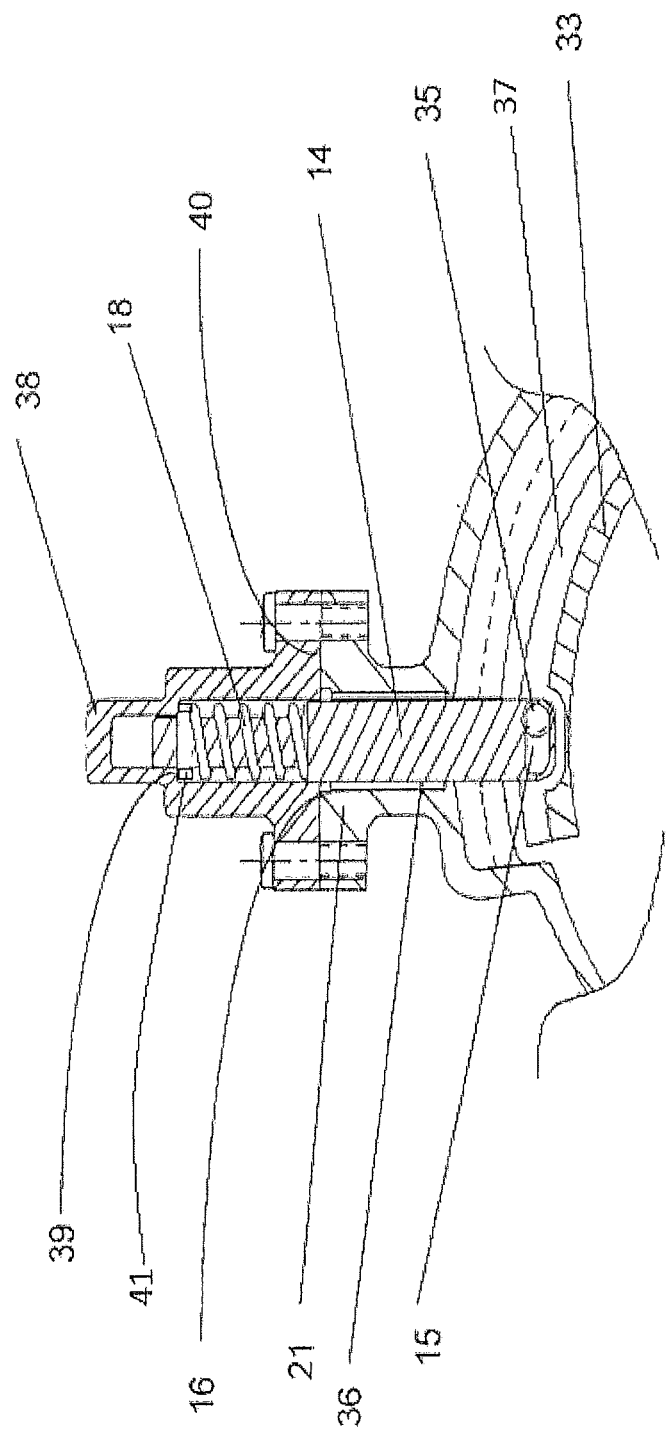
FIG. 13B depicts a section view of the actuator spring in combination with a shim.

In the exemplary embodiment of the invention, the backpressure in the exhaust system forces the pivotable outer volute wall against a spring (18), shown in detail in FIG. 13a, mounted in the actuator spring housing (38). To accommodate requirements for different rates of motion in the moving volute outer wall, the spring rate can be changed by substituting springs of different rates. To change the point at which the wall moves relative to the pressure in the volute, one or more shims (41) can be added to the reaction ledge (39) (FIG. 13b); or the depth of the spring recess may be adjusted by machining the surface of the mounting face (40) of the actuator housing (38), depending upon whether the spring seat pressure needs to increase or decrease. The addition of a base shim (41) under the spring (18) and the reaction ledge (39) allows the seat pressure to be modified without machining.

Figure 14:
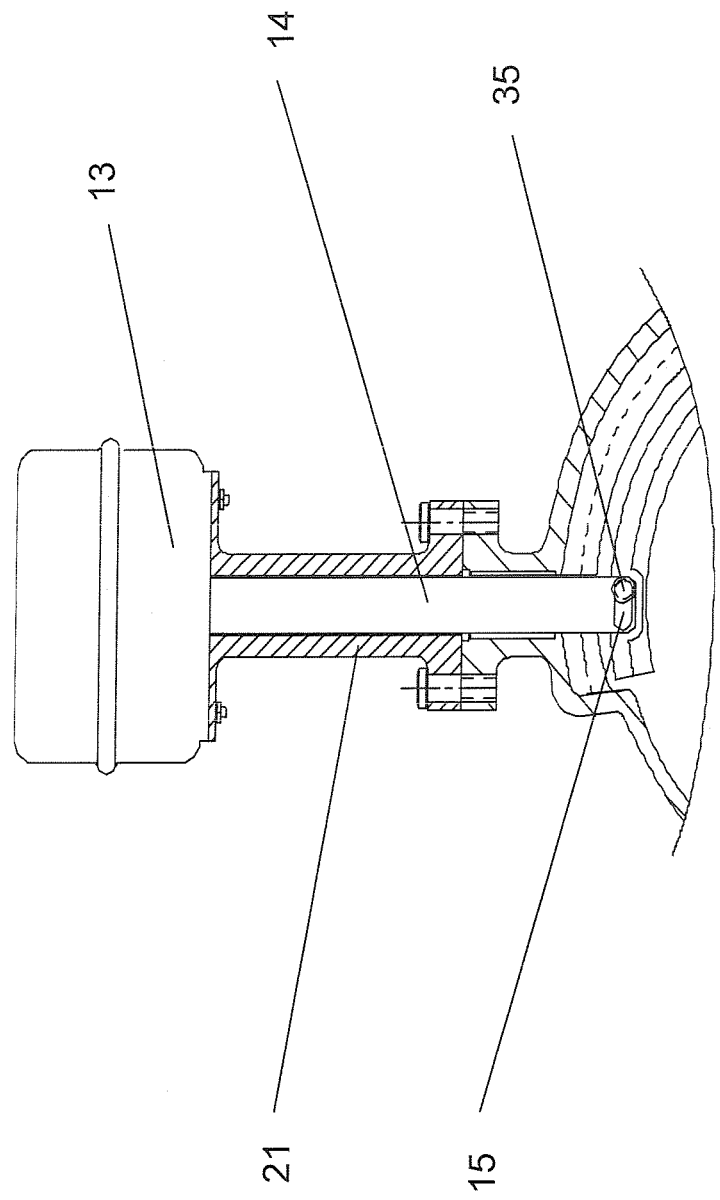
FIG. 14 depicts a section view of the configuration with an actuator.

In a variation to the first embodiment of the invention, an intelligent control strategy is employed using an actuator in place of a spring arrangement to move the pivotable outer volute wall to the desired position. In this variation, the actuator (13), as seen in FIG. 14 can be controlled by the engine ECU to command the pivotable outer volute wall to a position predicated by a change in engine behavior. The actuator power could be electric, pneumatic, vacuum, or hydraulic. In situations similar to this, the choice of actuator power is a function of cost and technical requirement.

Using this invention, the flow of exhaust gas to the turbine wheel is controlled, in a cost effective manner, without attenuation of the pulse energy in the exhaust gas as would be the case of a VTG with vanes.

Figures 11A, 11B:
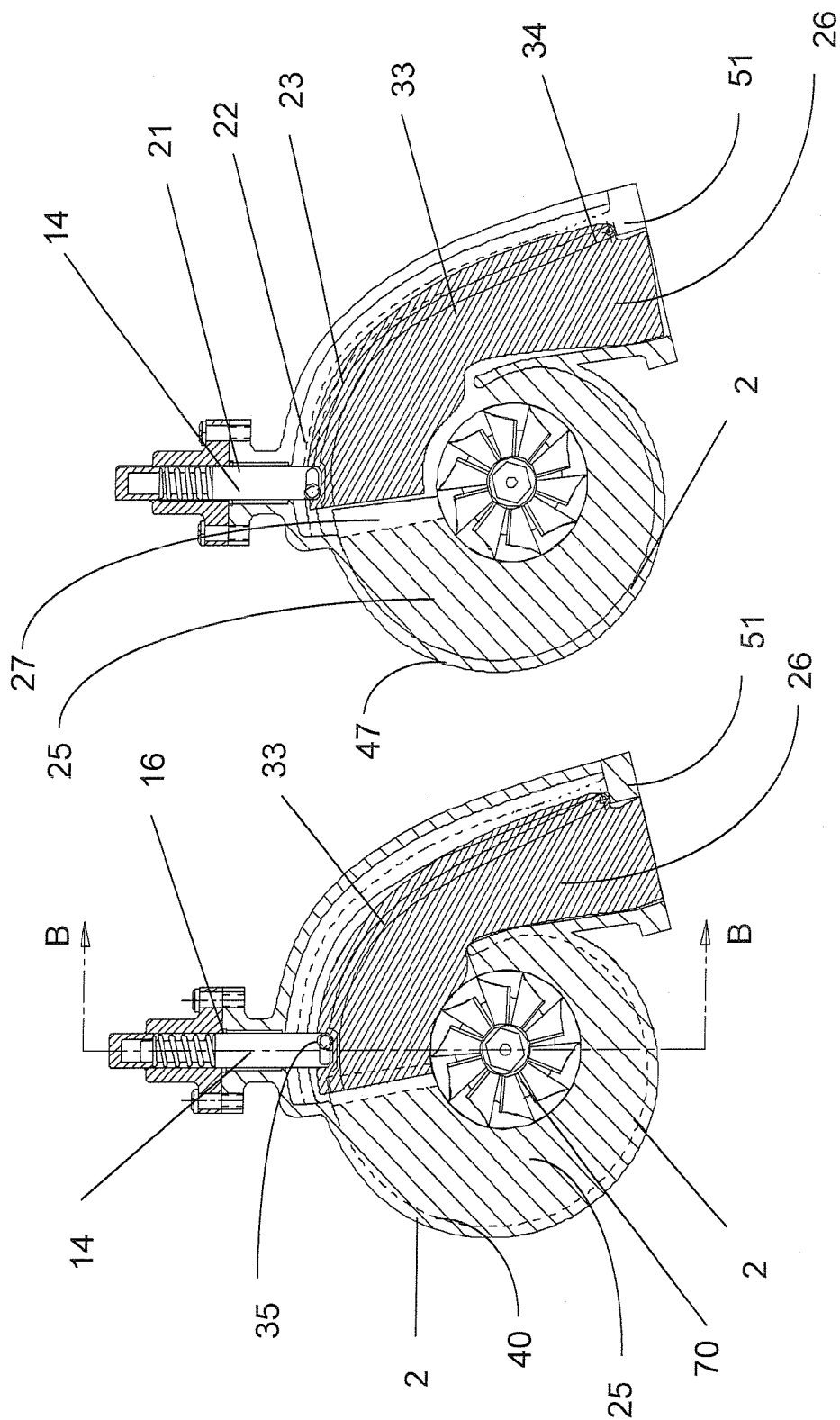
FIGS. 11A,B depict two views of a pivoting outer volute wall with divider wall.

In another variation to the first embodiment of the invention, the pivotable outer wall (33) contains a divider wall (26) fabricated into the pivotable outer wall of the exemplary first embodiment of the invention. As can be seen in FIGS. 11A, 11B and 12, the divider wall meshes with a fixed divider wall (25), which is cast as part of the turbine housing (2). The reason for the divider wall is to maintain the pulse energy from the engine so the movable divider wall (26) and the fixed divider wall (25) mesh with an offset feature (27) of the fixed divider wall (25) to ensure minimal crosstalk between the volutes (48 and 49). In some embodiments, the divider wall (26) is a solid divider wall (i.e., is free of openings as shown in FIG. 12A), and in other embodiments the divider wall (26) is provided with openings (26a) (FIG. 12B). The second embodiment of the invention also deals with changing the effective flow volume through the turbine housing volute, but in a different manner. In the second embodiment of the invention, a segment, containing a segment of a volute wall contour, pivots about the turbocharger geometric center to provide both a change in the volume in the volute and a change in area schedule. Unlike the first embodiment, which passes through slice "A" and affects the area at slice "A", which is typical of turbine housing design, in this embodiment, the effect is all downstream of slice "A".

In the second embodiment of the invention, the turbine housing volute outer wall (74) has a constant radius. Fitted within the turbine housing is a curved wedge segment (72), (the radially inside surface of which becomes the "wetted" outer wall of the volute while the radially outside surface of the helical segment mates with the constant radius outside wall of the turbine housing casting). The side walls of the angularly displaceable curved wedge segment are parallel to each other and travel partly behind the sidewalls of the turbine housing. The sidewalls of the turbine housing retain the spiral shape and root radii of a standard turbine housing to enhance the thermodynamic efficiency of the turbine housing volute geometry.

Figure 17:
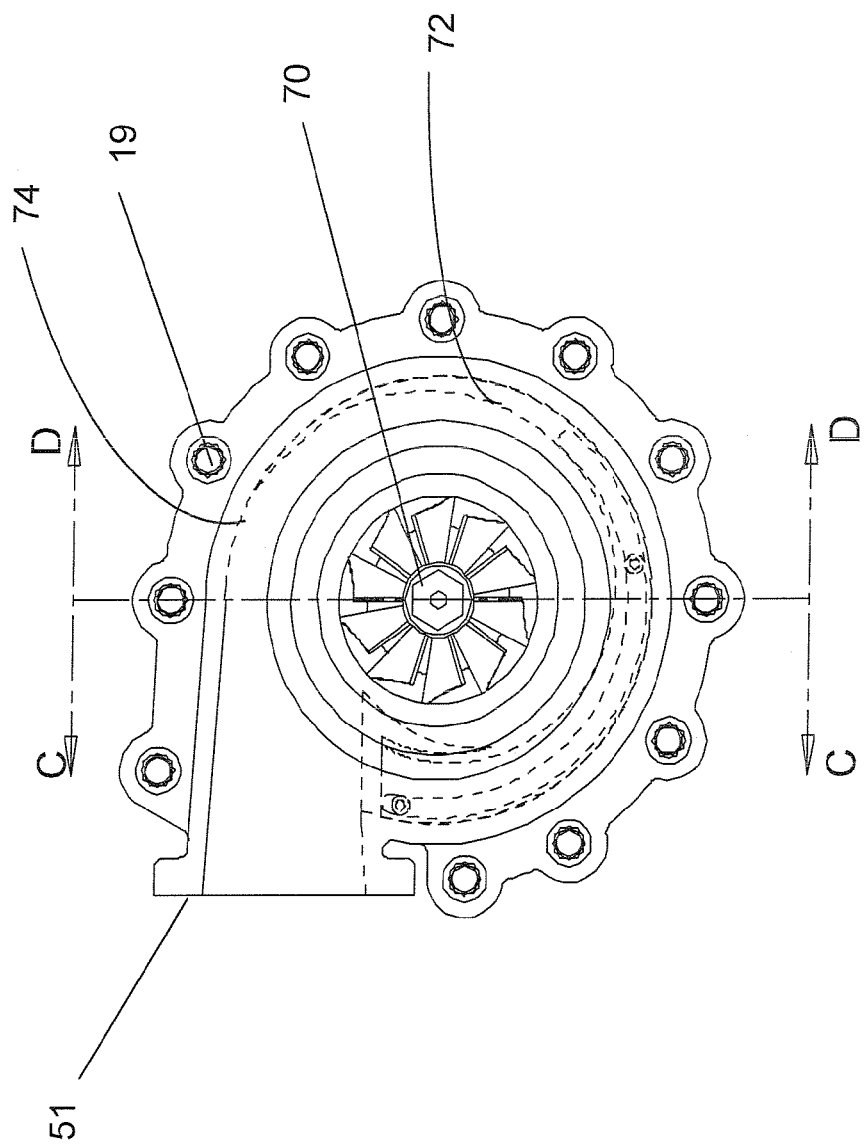
FIG. 17 depicts an end view of the assembly.

In the second embodiment of the invention, the curved wedge segment geometrically pivots about the turbo centerline, guided, in the exemplary embodiment, by two sets of rollers (77) which run in tracks (76) in the turbine housing casting. In order to assemble these rollers (77) to the curved wedge segment (72), and the curved wedge segment assembly to the turbine housing it may be necessary to split the turbine housing into two pieces. In the exemplary embodiment of the invention, the turbine housing is split into two halves (57 and 58), which can be fastened together with bolts, or nuts and bolts (19) as seen in FIG. 17. This is so that the curved wedge segment assembly with rollers can be assembled into the grooves (76) in the turbine housing halves (57 and 58).

Figure 15:
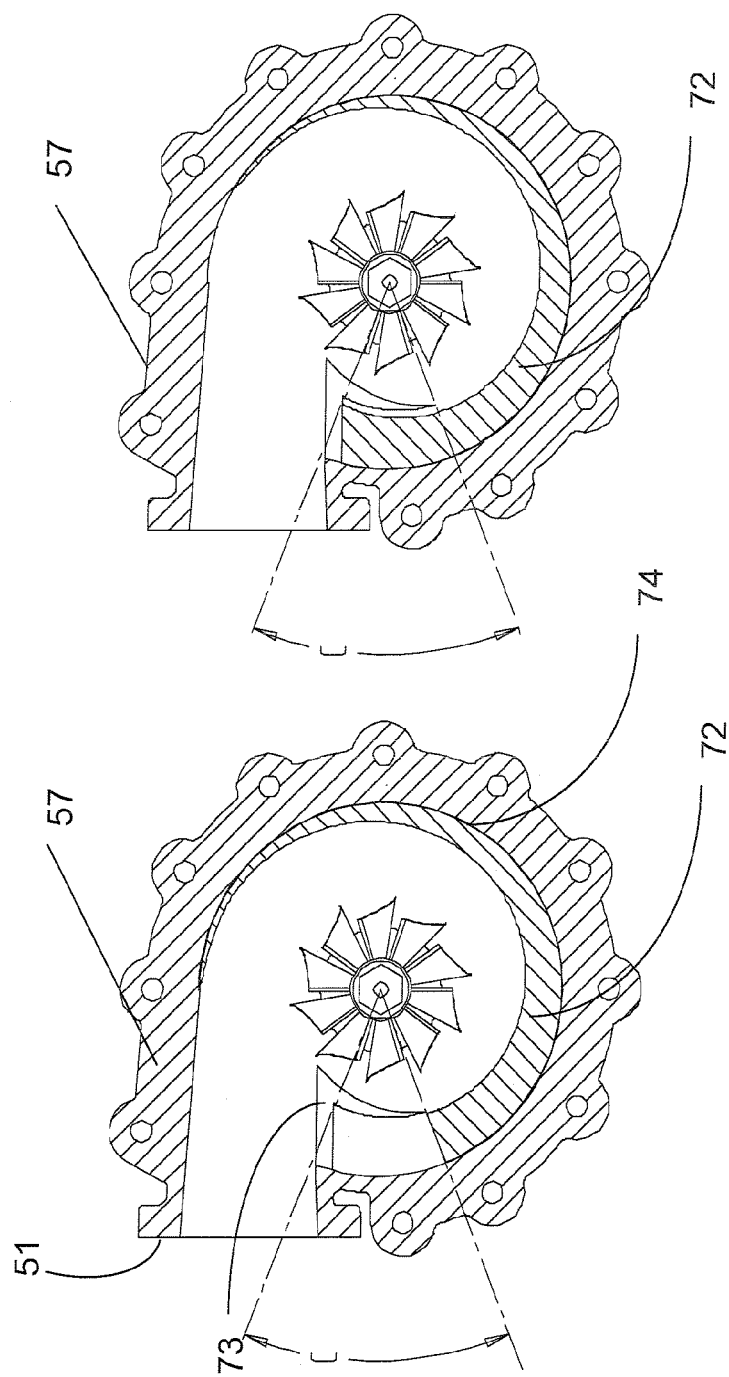
FIGS. 15A, B depict two views of the curved wedge segment of the second embodiment.

In order to generate a flow volume change when the curved wedge segment is pivoted about the turbocharger center, a chamber (73) is provided to "hide" the curved wedge segment when it is in the "minimum" volume configuration. The outer wall of the chamber (73) becomes the continuation of the inner wall of the curved wedge segment when the curved wedge segment is in its "maximum" configuration. In the "maximum" configuration the curved wedge segment can travel up to angle "C" as seen in FIGS. 15A and B.

Angle "C is the angle between two lines. The first line runs from the turbocharger axis to a point at the intersection of the inner surface and the end surface of the curved wedge segment, when the curved wedge segment is in its chamber to the fullest extent. The second line is a line from the turbocharger axis to the lower edge of the chamber.

In FIGS. 16A and 16B, the curved wedge segment is hidden to reveal the roller and track detail. The rollers (77) are mounted to the curved wedge segment (72) and run in tracks (76). FIG. 17 depicts an assembled side view of the second embodiment of the invention. FIGS. 18A and 18B show sections "C-C" and "D-D" to show how the curved wedge segment (72) has parallel sides which are contained under the outer sides of the surface of the volute in each of the turbine housing halves (57 and 58).

Figure 19C:
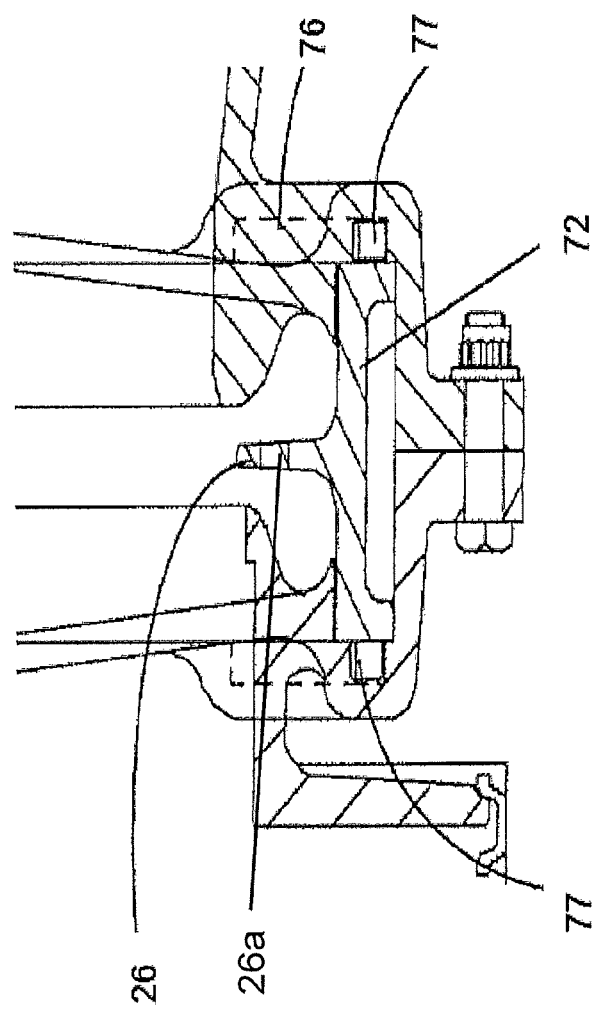
FIG. 19C depicts an alternative embodiment section C-C including openings in the divider walls.

In the first variation to the second embodiment of the invention, as seen in FIGS. 19A and B, the curved wedge segment carries a divider wall (26) to prevent crosstalk of the pulse energy between the volutes (48, 49) to deliver this energy to the turbine wheel. In order to minimize the crosstalk between the volutes, the divider wall (26) on the curved wedge segment seals against an offset of the fixed divider wall (25) which is cast into the turbine housing. The divider wall can be solid or it can have communicating openings (26a) formed in it to balance the pressures in the left and right hand volutes where a pressure balance is required (FIG. 19C).

In a second variation to the second embodiment of the invention, the curved wedge segment is guided by a pair of recesses fabricated into the sides of the turbine housing volute such that it mates with the axial outer and inner surfaces of the curved wedge segment. With this variation the curved wedge segment can be inserted, through the turbine housing foot into a one-piece turbine housing.

In a third variation to the second embodiment of the invention, as depicted in FIGS. 20A, B, C, the turbine housing (2) is cast as a single casting with a slot (79) fabricated in the side of the turbine housing volute wall. The slot (79) is fabricated so that it has a floor upon which the slot insert (80) locates axially. The slot insert carries within its inner face the groove (76) for the rollers (77) upon which the curved wedge segment locates. With the slot open, the grooves for the rollers on the opposite side of the curved wedge segment can be machined into the turbine housing. With the slot open the clearance for the curved wedge segment can also be machined into the turbine housing. When ready for assembly, the curved wedge segment, complete with rollers, is inserted into the turbine housing. The slot insert (80) is fitted into the turbine housing (2) and the slot insert is sealed to the turbine housing. The sealing and retention is preferably executed by staking the slot edges of the turbine housing over the slot insert. The sealing and retention can be done using any number of retention methods such as welding, press fitting, bolting etc.

Figure 21C:
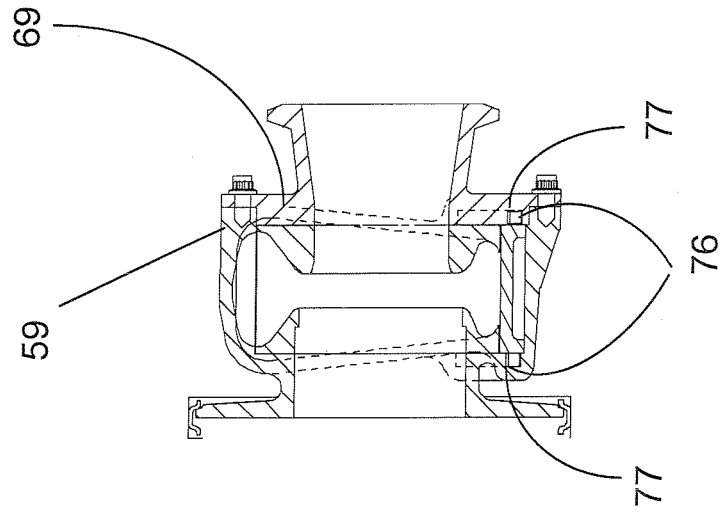
FIGS. 21A,B,C depict and end view and sections of the second variation of the second embodiment of the invention.
Figure 21B:
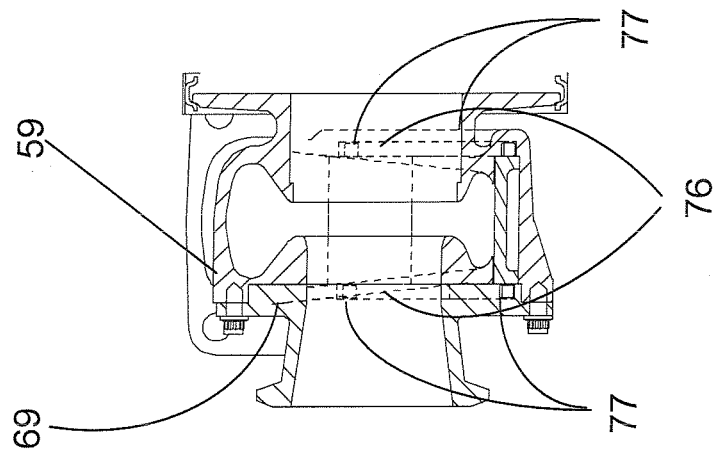
Figure 21A:
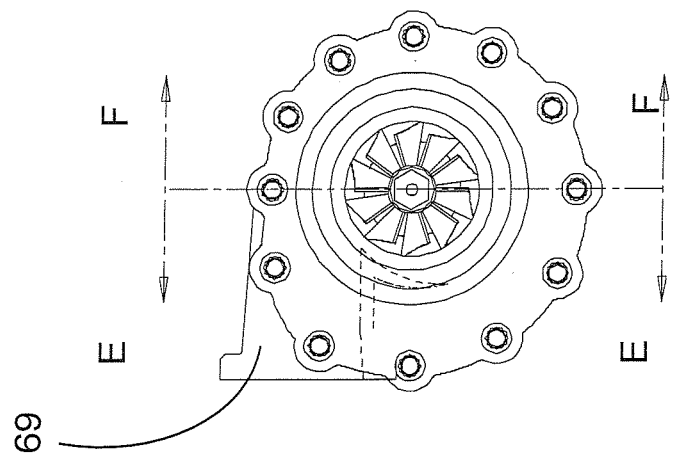

In a fourth variation to the second embodiment of the invention, as depicted in FIGS. 21A,B,C, the turbine housing (59) is cast as an open housing with the closure (69) containing the outer slot (76) features. The turbine housing (59) is fabricated to include the features of the inner slot (76). The side clearance between the curved wedge segment (72), the rollers (77), and the features in both the turbine housing (59) and the closure (69) is determined by the machining of the different features (slot depth, roller lateral position) and the relationship between the inner slot depth and the face upon which the closure (69), mates with the turbine housing face. The closure (69), in the exemplary third variation of the invention, is retained by bolts into tapped holes; but it could be retained by bolts and nuts, by peening, by staking, or by welding.

Figure 22:
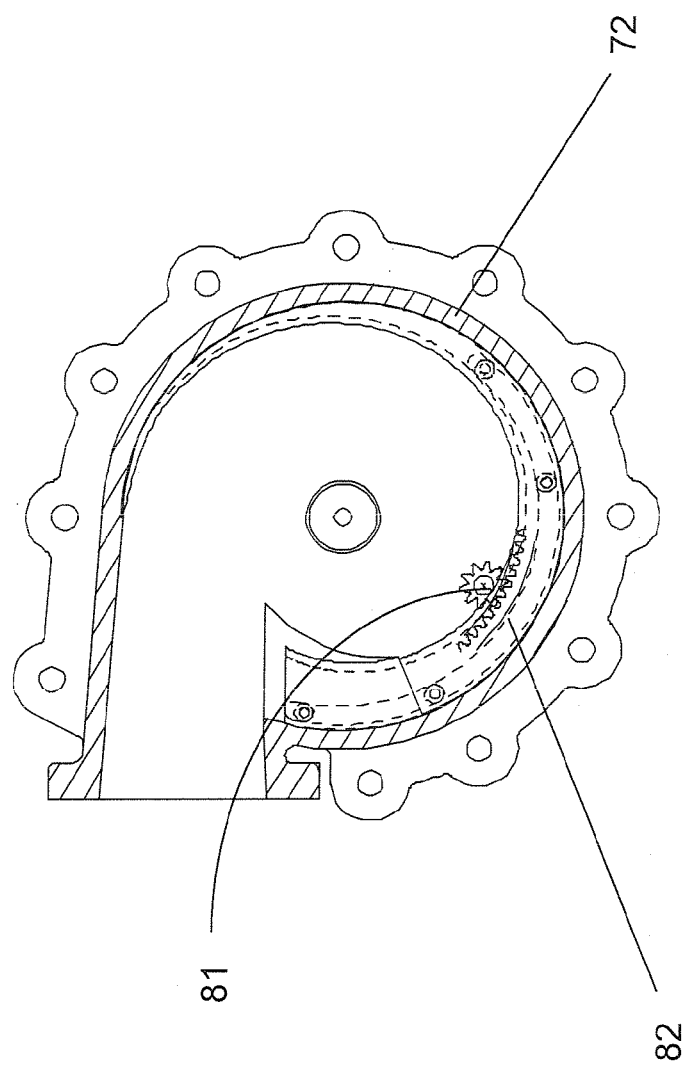
FIG. 22 depicts an embodiment with a rack and pinion type actuation means.

In the exemplary second embodiments of the invention, the commanded motion of the curved wedge segment is driven by a rack (82) and pinion (81) as shown in FIG. 22. The pinion is mounted in the wall of the turbine housing and the rack is fabricated onto the inner face of the curved wedge segment. The motion could me driven by a different configuration of the rack and pinion, or by a linear actuator connected to a pin on the curved wedge segment, or by a rotational actuator similarly linked to the curved wedge segment.

Now that the invention has been described, we claim:

1. A turbocharger for an internal combustion engine comprising:
   a turbine housing (2) including an inlet at a turbine housing foot (51) for receiving exhaust gas;
   a turbine wheel (70) rotatably mounted in said housing;
   a volute for directing exhaust gases from said inlet onto said turbine wheel, said volute including a radially outer wall, said radially outer wall constituted by
      a fixed radially outer wall segment of the turbine housing terminating in a tongue, and
      a pivotable radially outer wall (33) having an upstream end pivotably mounted to the turbine housing (2) upstream of the tongue and a curved downstream end, said pivotable radially outer wall pivotable from a retracted position further from the turbine wheel to an extended position nearer the turbine wheel; and
   a control device configured to control movement of the pivotable radially outer wall downstream end from said retracted position to the extended position,
   wherein the pivotable radially outer wall includes a reinforcing rib that protrudes from a radially outward-facing side of the pivotable radially outer wall, is elongated in a direction corresponding to a direction of exhaust gas flow through the turbine housing, and together with the pivotable radially outer wall is movable relative to the fixed radially outer wall segment.

2. The turbocharger as in claim 1, wherein the turbine wheel is solidly affixed to a shaft, wherein a compressor wheel (20) of a compressor is mounted to the other end of the shaft, wherein exhaust flow (100) from an engine exhaust manifold enters the turbine housing (2) via the turbine housing foot (51) to drive the turbine wheel (70) to provide rotational power to drive a compressor, whereby pressurized gas exits a compressor cover (10) through a compressor discharge (12) and is delivered to an intake of the engine,
   wherein said pivotable wall (33) is contoured such that when the pivotable wall is moved from the retracted position to the extended position:
   an upstream part of the pivotable radially outer wall (33) cooperates with the tongue to form a constriction for accelerating exhaust gas flow, and
   the curved downstream end of the pivotable wall directs gas flow closer to the turbine wheel,
   whereby the effective flow volume of the volute is reduced to enhance transient response of the engine.

3. The turbocharger as in claim 1, including an actuator spring housing (38) housing a spring (18) exercising a spring force urging the pivotable radially outer wall (33) towards the extended pivot position, such that at low backpressure the pivotable radially outer wall is urged by said spring into the extended position, and at high backpressure the backpressure overcomes the spring force and urges the pivotable radially outer wall to pivot to the retracted position.

4. The turbocharger as in claim 3, including at least one shim to increase spring seat pressure.

5. The turbocharger as in claim 1, wherein said reinforcing rib extends perpendicularly from said pivotable radially outer wall.

6. The turbocharger as in claim 1, wherein said control device is selected from the group consisting of a metal spring, hydraulic actuator, pneumatic actuator, or electric actuator.

7. The turbocharger as in claim 1, wherein said pivotable radially outer wall (33) includes a divider wall (26) extending radially inward, perpendicularly from said pivotable radially outer wall.

8. The turbocharger as in claim 7, wherein said divider wall (26) is a solid divider wall.

9. The turbocharger as in claim 7, wherein said divider wall (26) is provided with openings.

10. A turbocharger for an internal combustion engine comprising:
    a turbine housing (2) including an inlet at a turbine housing foot (51) for receiving exhaust gas;
    a turbine wheel rotatably mounted in said housing;
    a volute for directing exhaust gases from said inlet onto said turbine wheel, said volute including a radially outer wall, said radially outer wall constituted by
       a fixed radially outer wall segment of the turbine housing terminating in a tongue, and
       a flexible radially outer wall having an upstream end anchored to the turbine housing (2) upstream of the tongue and a curved downstream end, said flexible radially outer wall moveable from a retracted position further from the turbine wheel to an extended position nearer the turbine wheel; and
    a control device configured to control movement of the flexible radially outer wall downstream end from said retracted position to the extended position,
    wherein the flexible radially outer wall includes a reinforcing rib that protrudes from a radially outward-facing side of the flexible radially outer wall, is elongated in a direction corresponding to a direction of exhaust gas flow through the turbine housing, and together with the flexible radially outer wall is movable relative to the fixed radially outer wall segment.

11. A turbocharger for an internal combustion engine comprising:
    a turbine housing (2) including an inlet at a turbine housing foot (51) for receiving exhaust gas, said turbine housing including a volute with a radially outer wall (74) having a constant radius;
    a turbine wheel rotatably mounted in said housing;
    a rotating curved wedge segment (72) defined by a radially outer wall flush with said turbine housing wall (74) of constant radius, and a radially inner wall of constantly decreasing radius in the downstream direction, said curved wedge segment thus having a tapered upstream end and a wide downstream end, said rotating curved wedge segment mounted for rotating between a lower effective flow volume position and a higher effective flow volume position;
    a fixed curved wedge part (73) including a chamber for receiving the rotating curved wedge segment thick end when the rotating curved wedge segment (72) is rotated to a high effective flow volume position, and having an exterior defining a continuation of the rotating curved wedge segment when the rotating curved wedge segment is pivoted to the low effective flow volume position.

12. The turbocharger as in claim 11, wherein said rotating curved wedge segment (72) is guided by sets of rolling elements (77) which run in tracks (76) in the turbine housing casting.

13. The turbocharger as in claim 11, wherein said rotating wedge segment (72) is guided by the surface of the rotating wedge segment and tracks in the turbine housing casting.

14. The turbocharger as in claim 11, comprising a control device configured to control movement of the rotating curved wedge segment (72), the control device selected from the group consisting of a metal spring, hydraulic actuator, pneumatic actuator, or electric actuator.

15. The turbocharger as in claim 11, wherein said pivotable radially outer wall (33) includes a divider wall (26) extending radially inward, perpendicularly from said pivotable radially outer wall.

16. The turbocharger as in claim 15, wherein said divider wall (26) is a solid divider wall.

17. The turbocharger as in claim 15, wherein said divider wall (26) is provided with openings.

18. A method for controlling backpressure in a turbocharger for an internal combustion engine, the turbocharger comprising:
- a turbine housing (2) including an inlet at a turbine housing foot (51) for receiving exhaust gas;
- a turbine wheel rotatably mounted in said housing;
- a volute for directing exhaust gases from said inlet onto said turbine wheel, said volute including a radially outer wall, said radially outer wall constituted by
  - a fixed radially outer wall segment of the turbine housing terminating in a tongue, and
  - a pivotable radially outer wall (33) having an upstream end pivotably mounted to the turbine housing (2) upstream of the tongue and a curved downstream end, said pivotable radially outer wall pivotable from a retracted position further from the turbine wheel to an extended position nearer the turbine wheel; and
- a control device configured to control movement of the pivotable radially outer wall downstream end from said retracted position to the extended position said method comprising:
- pivoting said pivotable wall (33) to the extended position such that the upstream part of the pivotable wall cooperates with the tongue to form a smaller constriction for accelerating exhaust gas flow, and a curved terminal part of the pivotable wall directs gas flow closer to the turbine wheel, thereby reducing the effective flow volume of the volute to increase turbine backpressure, enhancing the ability of the system to drive EGR flow from the exhaust side of the engine to the inlet side of the engine, and
- pivoting said pivotable wall (33) to the retracted position such that the upstream part of the pivotable wall moves away from tongue to form a less restricted flow, and such that the curved terminal part of the pivotable wall directs gas flow further from to the turbine wheel, thereby increasing the effective volume of the volute to decrease turbine backpressure.

\* \* \* \* \*